US010533702B2

(12) United States Patent
Kahn

(10) Patent No.: US 10,533,702 B2
(45) Date of Patent: Jan. 14, 2020

(54) VIDEO WALL MOUNT

(71) Applicant: Peerless Industries, Inc., Aurora, IL (US)

(72) Inventor: Richard Kahn, Chicago, IL (US)

(73) Assignee: PEERLESS INDUSTRIES, INC., Aurora, IL (US)

( * ) Notice: Subject to any disclaimer, the term of this patent is extended or adjusted under 35 U.S.C. 154(b) by 0 days.

(21) Appl. No.: 15/758,498

(22) PCT Filed: Sep. 8, 2016

(86) PCT No.: PCT/US2016/050775
§ 371 (c)(1),
(2) Date: Mar. 8, 2018

(87) PCT Pub. No.: WO2017/044622
PCT Pub. Date: Mar. 16, 2017

(65) Prior Publication Data
US 2018/0252357 A1 Sep. 6, 2018

Related U.S. Application Data

(60) Provisional application No. 62/216,123, filed on Sep. 9, 2015.

(51) Int. Cl.
*F16M 13/00* (2006.01)
*F16M 13/02* (2006.01)
*A47B 97/00* (2006.01)

(52) U.S. Cl.
CPC ........... *F16M 13/02* (2013.01); *A47B 97/001* (2013.01); *F16M 2200/025* (2013.01); *F16M 2200/061* (2013.01)

(58) Field of Classification Search
CPC . F16M 11/10; Y10S 248/917; Y10S 248/919; Y10S 248/923; G06F 1/1601
(Continued)

(56) References Cited

U.S. PATENT DOCUMENTS 2,697,572 A 12/1954 Pfankuch
2,791,388 A 5/1957 Hirt
(Continued)

FOREIGN PATENT DOCUMENTS

CN 1728285 2/2006
CN 1917094 2/2007
(Continued)

OTHER PUBLICATIONS

International Search and Written Opinion for PCT/US2010/050410, dated Dec. 23, 2010.
(Continued)

*Primary Examiner* — Steven M Marsh
(74) *Attorney, Agent, or Firm* — Foley & Lardner LLP

(57) ABSTRACT

A mounting system that includes a second frame assembly movable relative to a first frame assembly and including a first and second hooks that engage/disengage first and second openings of the first frame assembly to secure the mounting system in a position; first and second release members configured to move the first and second hooks, respectively, to engage/disengage the associated opening upon movement of the release member; and a linkage assembly configured to communicate movement of one release member to move the other release member. The linkage assembly including a first link member operatively coupled to the first release member, a second link member operatively coupled to the second release member, and a third link member coupled to the first and second link members, such that movement of one of the first and second link members moves the other of the first and second link members.

24 Claims, 40 Drawing Sheets

(58) Field of Classification Search
USPC ..... 248/276.1, 279.1, 280.11, 281.11, 284.1, 248/917, 919, 923
See application file for complete search history.

(56) References Cited

U.S. PATENT DOCUMENTS

| | | | |
|---|---|---|---|
| 4,611,779 | A | 9/1986 | Leonard, Jr. |
| 5,138,134 | A | 8/1992 | Ellison |
| 5,245,990 | A | 9/1993 | Bertinin |
| 5,947,438 | A | 9/1999 | Lemire |
| 6,003,825 | A | 12/1999 | Abernathy, Jr. |
| 6,032,915 | A | 3/2000 | Brindisi |
| 6,095,479 | A | 8/2000 | Brindisi |
| 6,241,210 | B1 | 6/2001 | Brindisi |
| 6,283,434 | B1 | 9/2001 | Holder |
| 6,550,739 | B1 | 4/2003 | Brindisi |
| 6,554,242 | B2 | 4/2003 | Kim |
| 6,578,812 | B2 | 6/2003 | Lemire |
| D488,708 | S | 4/2004 | Lam et al. |
| D489,599 | S | 5/2004 | Lam |
| D493,800 | S | 8/2004 | Pfister et al. |
| D494,596 | S | 8/2004 | Pfister |
| D505,858 | S | 6/2005 | O'Keene |
| 6,905,101 | B1 | 6/2005 | Dittmer |
| 7,028,961 | B1 | 4/2006 | Dittmer et al. |
| D528,901 | S | 9/2006 | David |
| D530,595 | S | 10/2006 | Lam et al. |
| 7,152,836 | B2 | 12/2006 | Pfister et al. |
| 7,178,775 | B2 | 2/2007 | Pfister et al. |
| D538,632 | S | 3/2007 | Ly Hau et al. |
| D539,125 | S | 3/2007 | Ly Hau et al. |
| D539,128 | S | 3/2007 | Ly Hau et al. |
| D539,637 | S | 4/2007 | Ly Hau et al. |
| 7,300,029 | B2 | 11/2007 | Petrick et al. |
| D560,671 | S | 1/2008 | Muday et al. |
| 7,316,379 | B1 | 1/2008 | Graham |
| D570,852 | S | 6/2008 | Muday et al. |
| 7,380,760 | B2 | 6/2008 | Dittmer |
| 7,387,286 | B2 | 6/2008 | Dittmer et al. |
| 7,395,996 | B2 | 7/2008 | Dittmer |
| 7,438,269 | B2 | 10/2008 | Pfister et al. |
| 7,487,943 | B1 | 2/2009 | Gillespie |
| 7,494,099 | B2 * | 2/2009 | Shin .................. F16M 13/02 248/276.1 |
| 7,510,156 | B1 | 3/2009 | Yaeger |
| 7,523,907 | B2 | 4/2009 | Chen |
| 7,537,189 | B2 | 5/2009 | Jung et al. |
| D625,300 | S | 10/2010 | Stifal et al. |
| 7,950,613 | B2 * | 5/2011 | Anderson ............ F16M 13/02 248/282.1 |
| 8,094,438 | B2 | 1/2012 | Dittmer et al. |
| 8,456,808 | B2 | 6/2013 | Grey et al. |
| 8,523,129 | B2 | 9/2013 | Stifal |
| 8,693,172 | B2 | 4/2014 | Russell et al. |
| 9,004,430 | B2 | 4/2015 | Conner |
| 9,109,742 | B2 * | 8/2015 | Smith .................. F16M 11/10 |
| 2002/0033436 | A1 | 3/2002 | Peng et al. |
| 2002/0179791 | A1 | 12/2002 | Kwon |
| 2002/0179801 | A1 | 12/2002 | Kim |
| 2003/0141425 | A1 | 7/2003 | Obdeijn |
| 2005/0087661 | A1 | 4/2005 | Rabenius |
| 2005/0097586 | A1 | 5/2005 | Hara et al. |
| 2005/0110911 | A1 | 5/2005 | Childrey et al. |
| 2005/0133678 | A1 | 6/2005 | Dittmer |
| 2005/0167549 | A1 | 8/2005 | Ligertwood |
| 2005/0236542 | A1 | 10/2005 | O'Neill |
| 2005/0274855 | A1 | 12/2005 | Shin |
| 2006/0006295 | A1 | 1/2006 | Gainer |
| 2006/0231711 | A1 | 10/2006 | Shin |
| 2006/0244870 | A1 | 11/2006 | Yamato et al. |
| 2006/0291152 | A1 | 12/2006 | Bremmon |
| 2007/0007412 | A1 * | 1/2007 | Wang .................. F16M 11/10 248/284.1 |
| 2007/0007413 | A1 * | 1/2007 | Jung .................... F16M 11/10 248/284.1 |
| 2007/0023593 | A1 | 2/2007 | Fedewa |
| 2007/0023599 | A1 * | 2/2007 | Fedewa ............... F16M 11/10 248/284.1 |
| 2007/0083880 | A1 | 4/2007 | Bae |
| 2007/0158515 | A1 | 7/2007 | Dittmer et al. |
| 2007/0221807 | A1 | 9/2007 | Park |
| 2008/0078907 | A1 | 4/2008 | Huang |
| 2008/0315049 | A1 | 12/2008 | Bailo et al. |
| 2009/0050763 | A1 | 2/2009 | Dittmer |
| 2009/0057515 | A1 | 3/2009 | Chuang |
| 2009/0065667 | A1 | 3/2009 | Bakkom et al. |
| 2009/0159768 | A1 | 6/2009 | Oh |
| 2009/0194655 | A1 | 8/2009 | Huang |
| 2009/0256040 | A1 | 10/2009 | Lee et al. |
| 2010/0207006 | A1 * | 8/2010 | Kim ..................... F16M 11/10 248/625 |
| 2010/0219315 | A1 | 9/2010 | Muday et al. |
| 2011/0198460 | A1 | 8/2011 | Stifal et al. |
| 2013/0176667 | A1 * | 7/2013 | Kulkarni ............. F16M 11/10 361/679.01 |

FOREIGN PATENT DOCUMENTS

| | | |
|---|---|---|
| CN | 201293191 | 8/2009 |
| CN | 101566268 | 10/2009 |
| EP | 2 093 473 A1 | 8/2009 |
| TW | M37221 U | 7/2008 |
| WO | WO-03/036950 A1 | 5/2003 |
| WO | WO-2009/033133 A1 | 3/2009 |
| WO | WO-2009/089178 A1 | 7/2009 |

OTHER PUBLICATIONS

*Peerless Industries, Inc.*, v. *Trippe Manufacturing Co.*, a corporation, d/b/a Tripp Lite, Complaint and Jury Demand, Case No. 14-cv-7941, United States District Court for the Northern District of Illinois Eastern Division, filed Oct. 10, 2014.

First Office Action for Chinese Patent Application No. 201510076826.0, issued a 5, 2016, 9 pages.

European Patent Office Communication issued for European Patent Application 10786111.6, dated Jul. 11, 2013, 5 pages.

International Search Report and Written Opinion issued for PCT/U.S. 2016/050775, dated Nov. 28, 2016, 7 pages.

* cited by examiner

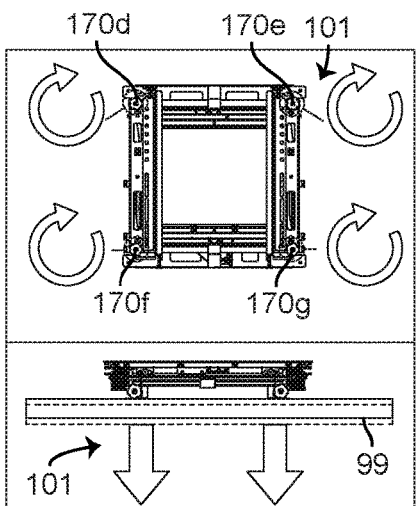
FIG. 52
FIG. 53
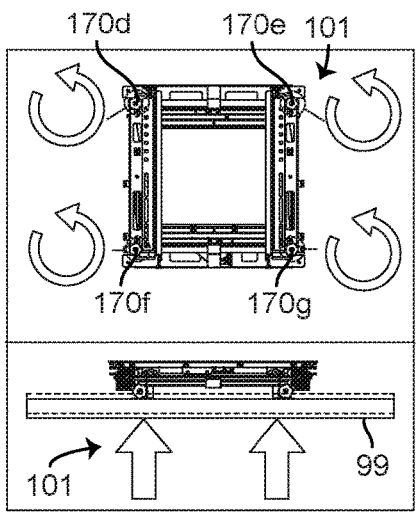
FIG. 54
FIG. 55
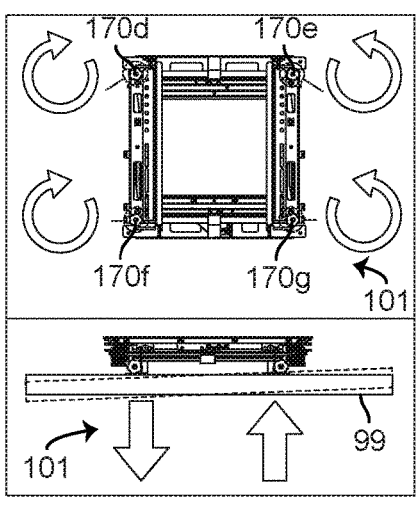
FIG. 56
FIG. 57
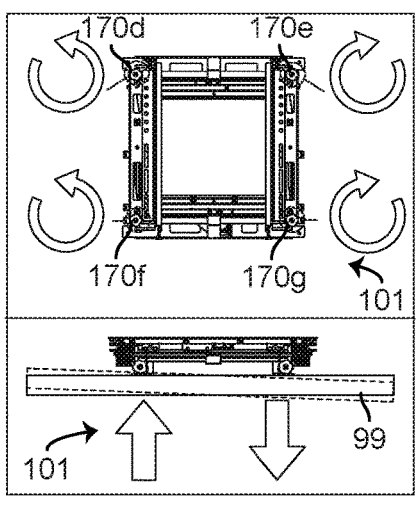
FIG. 58
FIG. 59
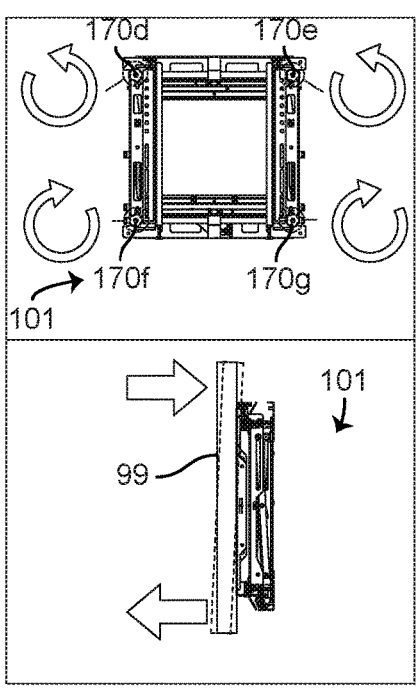
FIG. 60
FIG. 61
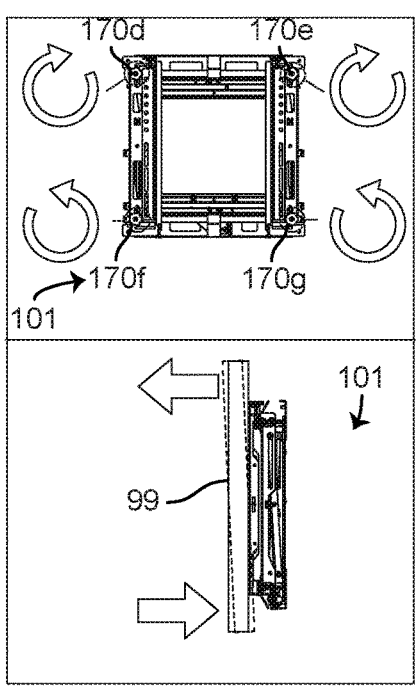
FIG. 62
FIG. 63

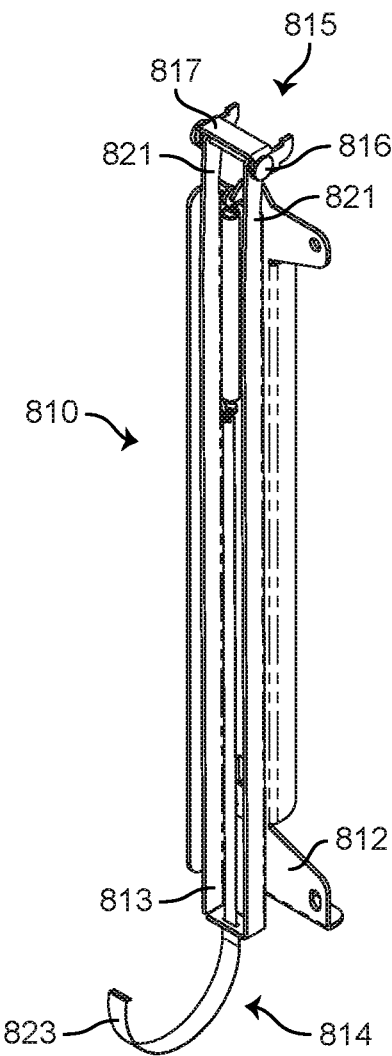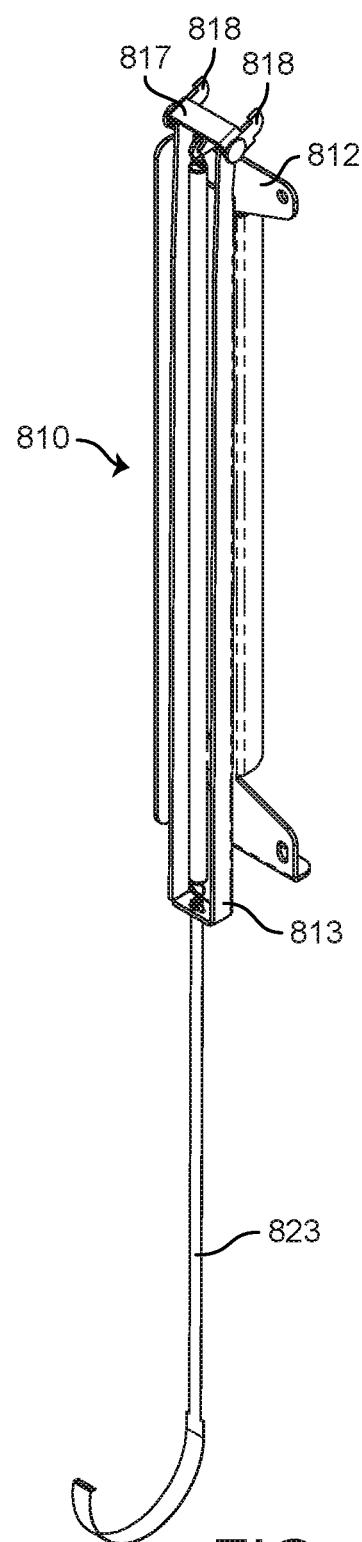
FIG. 65
FIG. 66

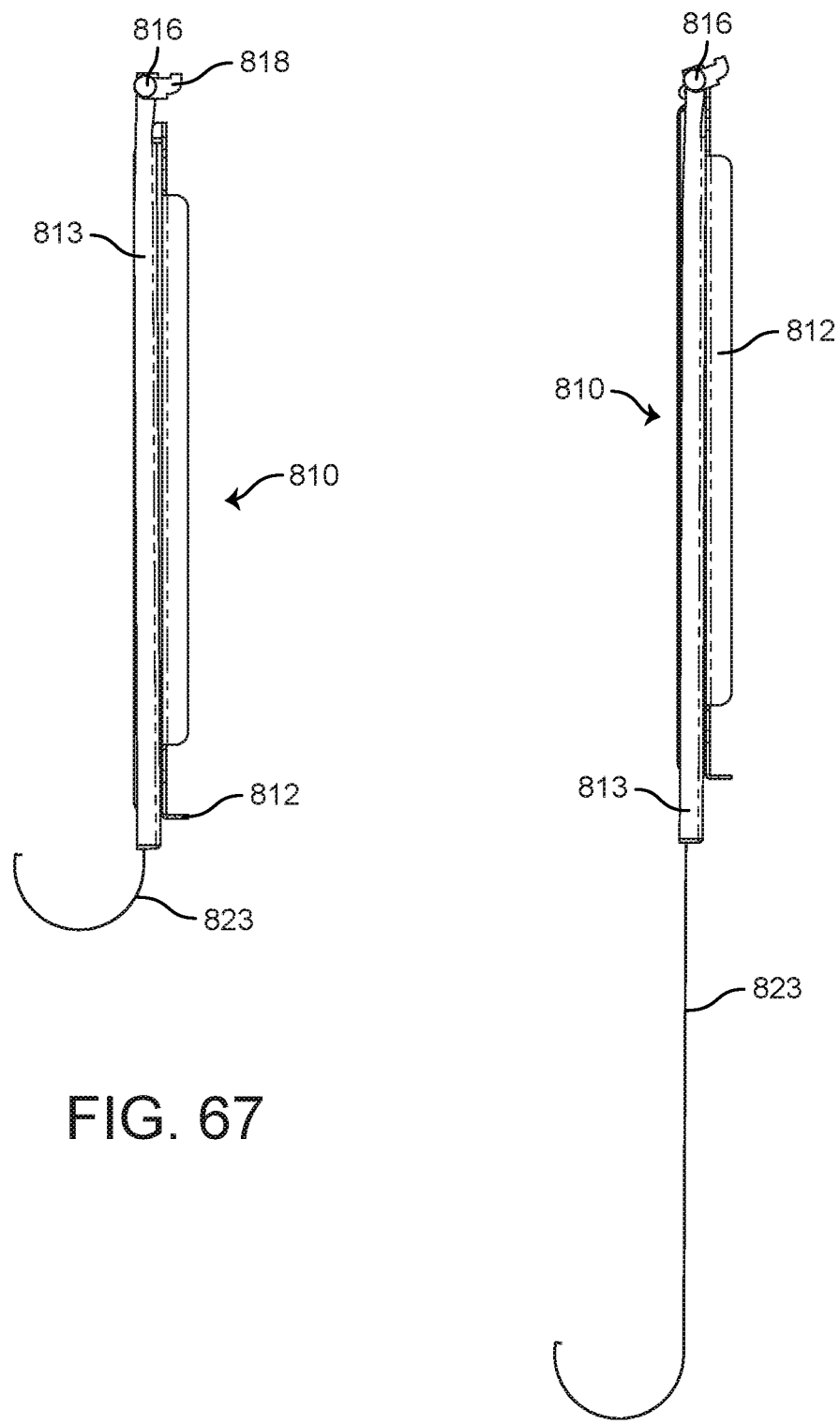

VIDEO WALL MOUNT

CROSS-REFERENCE TO RELATED APPLICATIONS

The present application is a national stage of PCT Application No. PCT/US2016/050775, filed Sep. 8, 2016, which claims the benefit of and priority to U.S. Provisional Patent Application No. 62/216,123, filed on Sep. 9, 2015. The contents of both applications are incorporated herein by reference in their entirety.

TECHNICAL FIELD

The present application relates generally to mounting systems for devices. More particularly, the present invention relates to adjustable mounting systems for mounting flat-panel displays and similar devices.

BACKGROUND

Various adjustable display mounts have been developed that permit adjustment of the position and/or orientation of the attached display in various degrees of freedom. Some of these adjustable mounts permit a user to move aspects of the mount to reposition the location of a display in space relative to a mounting surface. Other mounts allow an attached display to pivot about an axis and/or provide for adjustment of the rotational (i.e., skew) and/or tilt orientation of the display. Such display mounts enable gross positioning of a display device to obtain a preferred viewing position and orientation for the device relative to a viewer.

SUMMARY

One embodiment relates to a mounting system that is configured to support a display device and is configurable in a first position and a second position that is different than the first position. The mounting system includes a first frame assembly, a second frame assembly, a first release member, a second release member, and a linkage assembly. The first frame assembly is configured to mount to a mounting surface. The second frame assembly is movable relative to the first frame assembly and is configured to support the display device. The second frame assembly includes a first hook that is configured to engage a first opening of the first frame assembly and a second hook that is configured to engage a second opening of the first frame assembly to secure the mounting system in the first position. The first release member is configured to move the first hook to engage and disengage the first opening upon movement of the first release member. The second release member is configured to move the second hook to engage and disengage the second opening upon movement of the second release member. The linkage assembly is configured to communicate movement of one of the first and second release members to move the other of the first and second release members. The linkage assembly includes a first link member operatively coupled to the first release member, a second link member operatively coupled to the second release member, and a third link member coupled to the first and second link members, such that movement of one of the first and second link members moves the other of the first and second link members through the third link member.

Another embodiment relates to a mounting system configured to support a display device and configurable in more than one position to adjust a position of the display device. The mounting system includes a first frame assembly that is configured to mount to a mounting surface and a second frame assembly that is movable relative to the first frame assembly through an adjustment assembly. The second frame assembly includes a first side member and a second side member that is spaced apart from the first side member. The mounting system also includes a latch mechanism for securing the second frame assembly relative to the first frame assembly in at least one position, a first release member that is configured to move the latch mechanism into a non-locking position allowing movement of the second frame assembly relative to the first frame assembly, a second release member spaced apart from the first release member and configured to move the latch mechanism into the non-locking position, a first linkage assembly and a second linkage assembly. The first linkage assembly is configured to communicate movement of one of the first and second release members to move the other of the first and second release members, and the first linkage assembly is associated with the first side member. The second linkage assembly is configured to communicate movement of one of the first and second release members to move the other of the first and second release members, and the second linkage assembly is associated with the second side member.

Yet another embodiment relates to a mounting system configured to support a display device and configurable in more than one position to adjust a position of the display device. The mounting system includes a first frame assembly that is configured to mount to a mounting surface and a second frame assembly that is movable relative to the first frame assembly between an extended position and a retracted position. The second frame assembly includes a first side member and a second side member that is spaced apart from the first side member. The mounting system also includes a latch mechanism that is configured to secure the second frame assembly to the first frame assembly in the retracted position, a first release member that is configured to release the latch mechanism allowing movement of the second frame assembly relative to the first frame assembly, a second release member that is spaced apart from the first release member and configured to release the latch mechanism, and a first linkage assembly that is configured to communicate movement of one of the first and second release members to move the other of the first and second release members. The first linkage assembly is associated with (e.g., nested with) one of the first and second side members.

BRIEF DESCRIPTION OF THE DRAWINGS

FIG. 52 is a front view of the mounting system of FIG. 1, showing a forward adjustment of the attached display device.

FIG. 53 is a top view of the mounting system of FIG. 52.

FIG. 54 is a front view of the mounting system of FIG. 1, showing a rearward adjustment of the attached display device.

FIG. 55 is a top view of the mounting system of FIG. 54.

FIG. 56 is a front view of the mounting system of FIG. 1, showing a first tilt of the attached display device about a yaw axis.

FIG. 57 is a top view of the mounting system of FIG. 56.

FIG. 58 is a front view of the mounting system of FIG. 1, showing a second tilt of the attached display device about a yaw axis.

FIG. 59 is a top view of the mounting system of FIG. 58.

FIG. 60 is a front view of the mounting system of FIG. 1, showing a first tilt of the attached display device about a pitch axis.

FIG. 61 is a side view of the mounting system of FIG. 60.

FIG. 62 is a front view of the mounting system of FIG. 1, showing a second tilt of the attached display device about a pitch axis.

FIG. 63 is a side view of the mounting system of FIG. 62.

FIG. 65 is a perspective view of the release mechanism shown in FIG. 64 in a locking position.

FIG. 66 is a perspective view of the release mechanism shown in FIG. 65 in a non-locking position.

FIG. 67 is a side view of the release mechanism shown in FIG. 65.

FIG. 68 is a side view of the release mechanism shown in FIG. 66.

DETAILED DESCRIPTION

Figure 1:
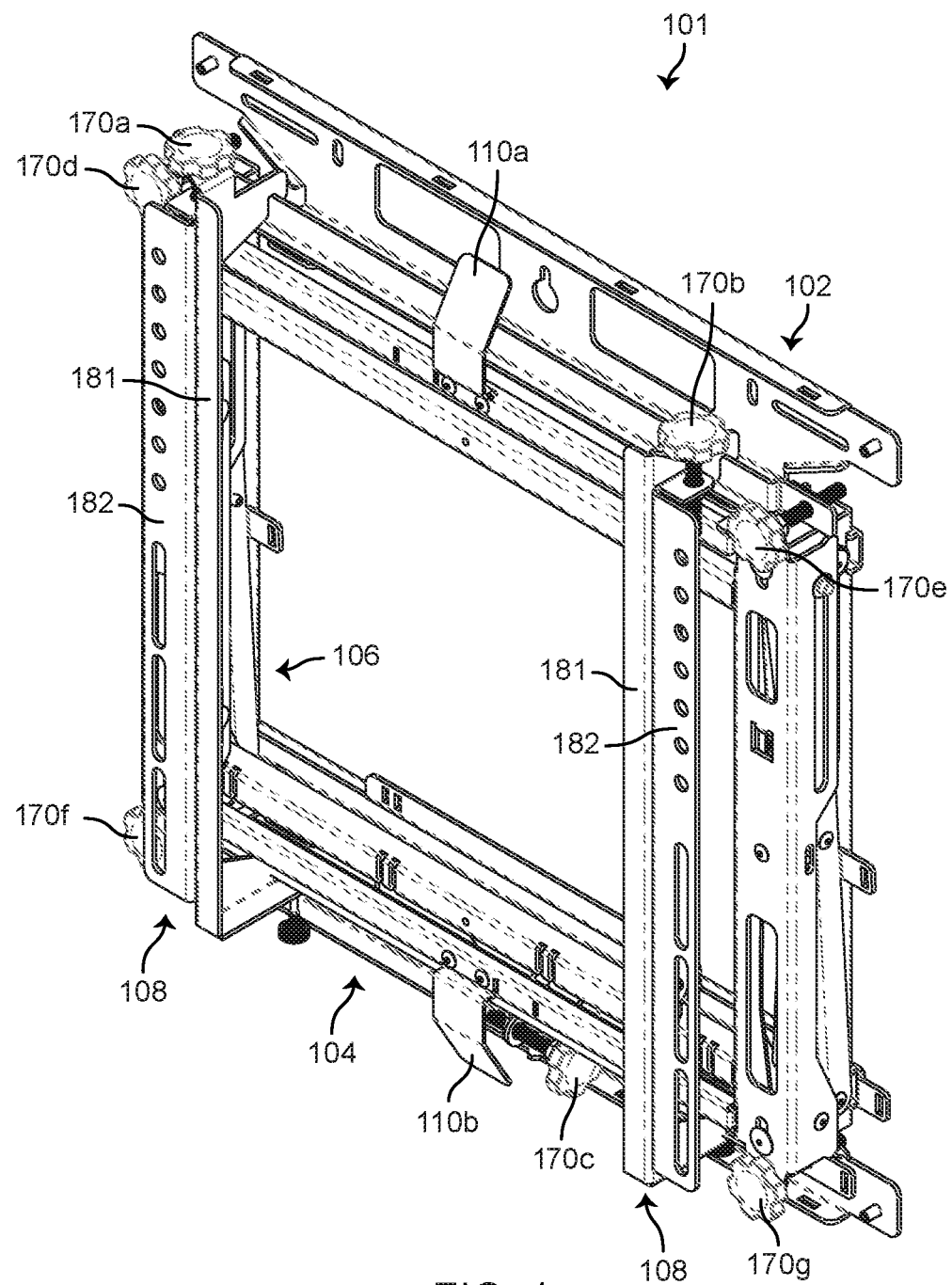
FIG. 1 is a perspective view of an exemplary embodiment of a mounting system, shown in a collapsed position.

Referring generally to the Figures, disclosed herein are mounting systems (e.g., mounts) that are configured to adjustably couple an audio/visual device (e.g., a flat panel display, a display device, etc.) to a mounting surface, such as, for example, a wall, a support or other surface capable of supporting the mounting system and the audio/visual device coupled thereto.

FIGS. 1-24 illustrate an exemplary embodiment of a mounting system 101 (e.g., mounting assembly, etc.). The mounting system 101 is configured to attach a display device (not shown) to a mounting surface (e.g., of a wall, a fixture, or other suitable device). The mounting system 101 may also be used to operatively attach one or more display devices to a stand or other portable unit. Various portions of the mounting system 101 are selectively movable in relation to each other, such that the position and orientation of the attached display may be adjusted in a plurality of dimensions or degrees of freedom. The various features of the mounting system 101 provide for independent control of translational and rotational degrees of freedom of the attached display relative to the mounting surface. Through adjustment of the various features of the mounting system 101, optimization of the position and orientation of the attached display can be achieved relative to a mounting surface and/or adjacent displays, such as when the mounting system 101 is used in the context of a video wall application comprising an array of display devices.

As shown, the mounting system 101 includes a surface mount assembly 102 configured to couple (e.g., operatively attach) the mounting system 101 to a mounting surface, an adjustment assembly 104, and a pair of device mount assemblies 108 configured to couple a display device to the mounting system 101. The adjustment assembly 104 is configured to provide adjustment of the device mount assemblies 108 relative to the surface mount assembly 102. According to other embodiments, one or more device mount assemblies 108 may be used with the systems. The display device may be detachably affixed to the one or more device mount assemblies 108 through one or more connecting element or other suitable elements. Additionally, each device mount assembly 108 may be adjustably and/or detachably affixed to, for example, the adjustment assembly 104 to allow relative adjustment of the respective device mount assembly 108 relative to the surface mount assembly 102, such as to allow a user to adjust the position (e.g., alignment, location, etc.) of the display device coupled to the mounting system 101.

The surface mount assembly 102 may be detachably affixed (e.g., secured, coupled, etc.) to the mounting surface through one or more connecting element (e.g., bolt, screw, other fasteners, hook, etc.) or other suitable elements. The surface mount assembly 102 includes one or more than one member that defines an attachment surface 120 configured to be secured to a mounting surface (see FIGS. 5-8). For example, the attachment surface 120 may be detachably affixed to a wall (e.g., a substantially vertical surface) such that at least a portion of the attachment surface 120 abuts at least a portion of the wall. The attachment surface 120 (e.g., the members forming the attachment surface 120) may include one or more openings 121 (e.g., holes, slots, apertures, etc.), which may receive connecting elements (e.g., fasteners or other suitable elements) that may be used to attach the surface mount assembly 102 to the mounting surface.

The surface mount assembly 102 includes one or more members that may be interconnected or separated from any other member. As shown best in FIGS. 2 and 5-8, the surface mount assembly 102 includes an upper mounting member 122 and a lower mounting member 123 spaced apart from the upper mounting member 122. The attachment surface 120 may be defined by a portion of the upper mounting member 122, a portion of the lower mounting member 123, or a combination thereof. For example, a portion of the upper mounting member 122 may define a first portion of the attachment surface 120, and a portion of the lower mounting member 123 may define a second portion of the attachment surface 120. The first and second portions of the attachment surface 120 may be substantially parallel (e.g., coplanar). Each member 122, 123 of the surface mount assembly 102 includes one or more openings 121 to facilitate mounting (e.g., coupling, attaching, etc.) the member to the mounting surface. Each member 122, 123 of the surface mount assembly 102 may be configured as flat plates, may include flanges, tabs, or other suitable formed features, or may have any suitable shape.

Figure 11:
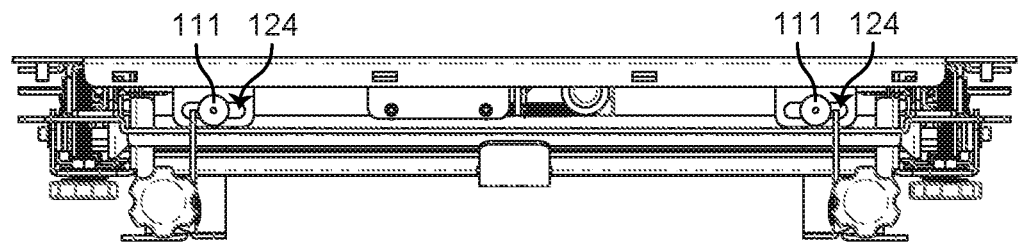
FIG. 11 is a top view of the mounting system of FIG. 1 configured in the collapsed position.
Figure 12:
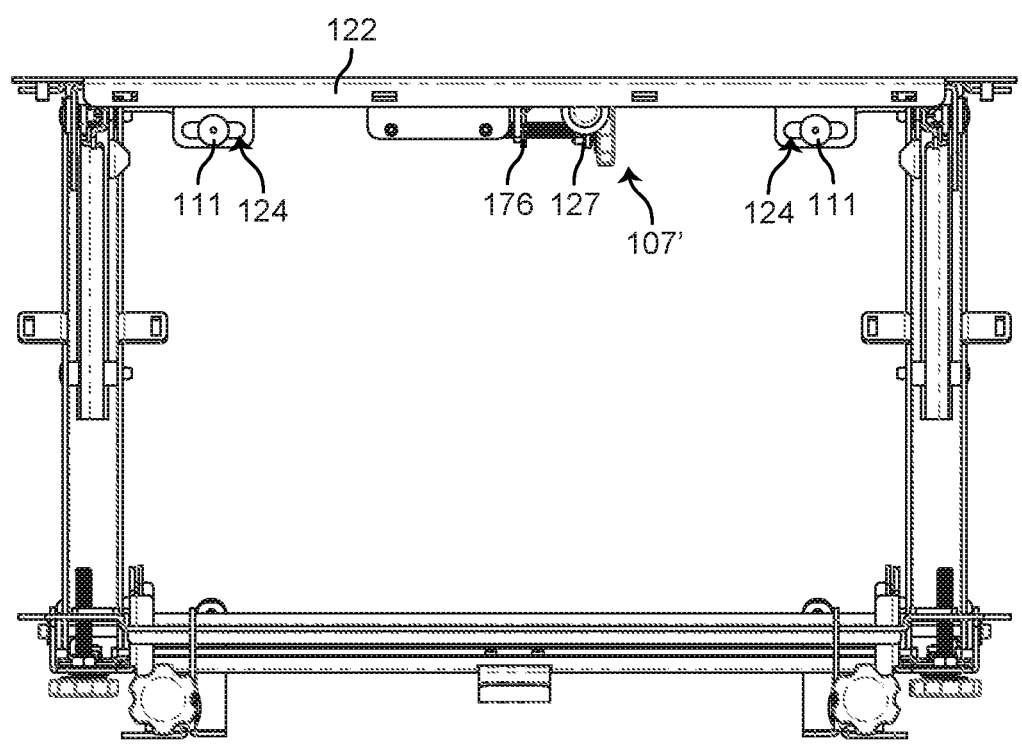
FIG. 12 is a top view of the mounting system of FIG. 1 configured in the extended position.
Figure 13:
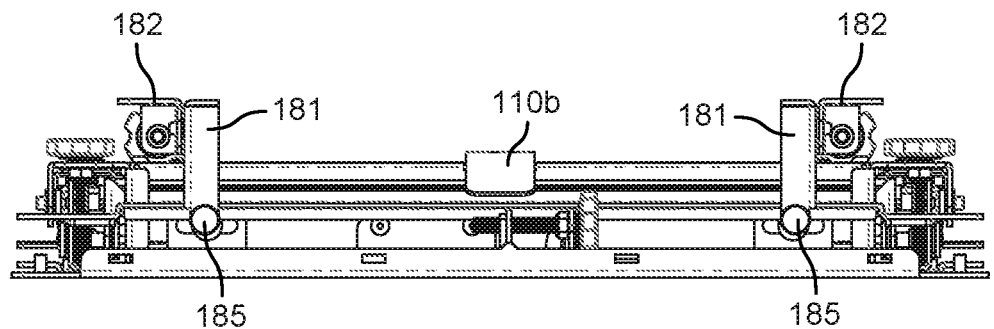
FIG. 13 is a bottom view of the mounting system of FIG. 1 configured in the collapsed position.
Figure 14:
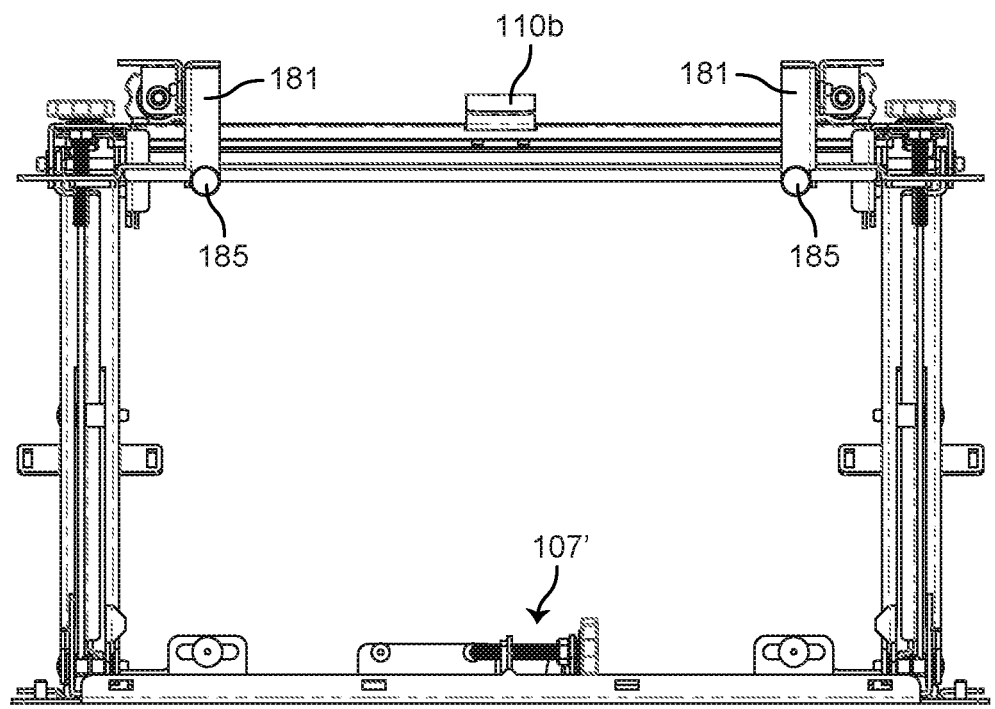
FIG. 14 is a bottom view of the mounting system of FIG. 1 configured in the extended position.
Figure 17:
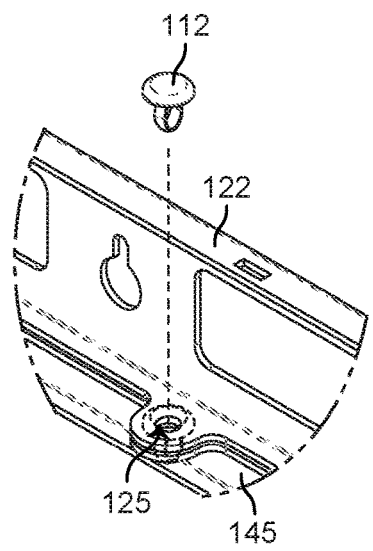
FIG. 17 is another detail view of a portion of the mounting system shown in FIG. 2.

As shown, the upper mounting member 122 includes a flat base portion that is configured to mount to the mounting surface and includes the portion of the attachment surface 120, an upper flange that extends inwardly from the base portion, and a lower flange that is offset from the upper flange. As shown in FIGS. 11, 12 and 17, the lower flange of the upper mounting member 122 includes two spaced apart slotted openings 124 and a circular (e.g., round) opening 125. Each slotted opening 124 extends lengthwise in a lateral direction to allow for lateral adjustment (e.g., side-to-side adjustment) of the adjustment assembly 104 relative to the surface mount assembly 102, as discussed in more detail below. The openings 124, 125 may be configured in the lower flange of the upper mounting member 122. The circular opening 125 is configured to receive an insert (e.g., a rivet, such as a plastic rivet) that is configured to further engage a corresponding circular opening in the adjustment assembly 104 to prevent relative lateral movement between the assemblies, such as during installation. Thus, the insert may be removed following installation of the mounting system 101, such as to allow for relative movement (e.g., lateral movement) between the adjustment assembly 104 and the surface mount assembly 102.

As shown, the lower mounting member 123 includes a flat base portion that is configured to mount to the mounting surface and includes the portion of the attachment surface 120, an upper flange that extends inwardly from the base portion, and a lower flange that is offset from the upper flange. A flange (e.g., the upper flange) of the lower mounting member 123 includes two spaced apart slotted openings 126 (see FIG. 18), where each slotted opening 126 extends lengthwise in a lateral direction to allow for lateral adjustment (e.g., side-to-side adjustment) of the adjustment assembly 104 relative to the surface mount assembly 102, as discussed below in more detail.

As shown best in FIGS. 12 and 19, the lower mounting member 123 includes one or more flanges 127 that are configured to support an anti-backlash mechanism, as discussed in more detail below. For example, a pair of spaced-apart flanges 127 may be employed with each mechanism. Also for example, a single flange 127 may be used with each mechanism. Each flange 127 extends from the base portion of the lower mounting member 123 and includes a hole 128 or similar opening therein. Each hole 128 may be configured as a threaded hole or a through hole.

Figure 2:
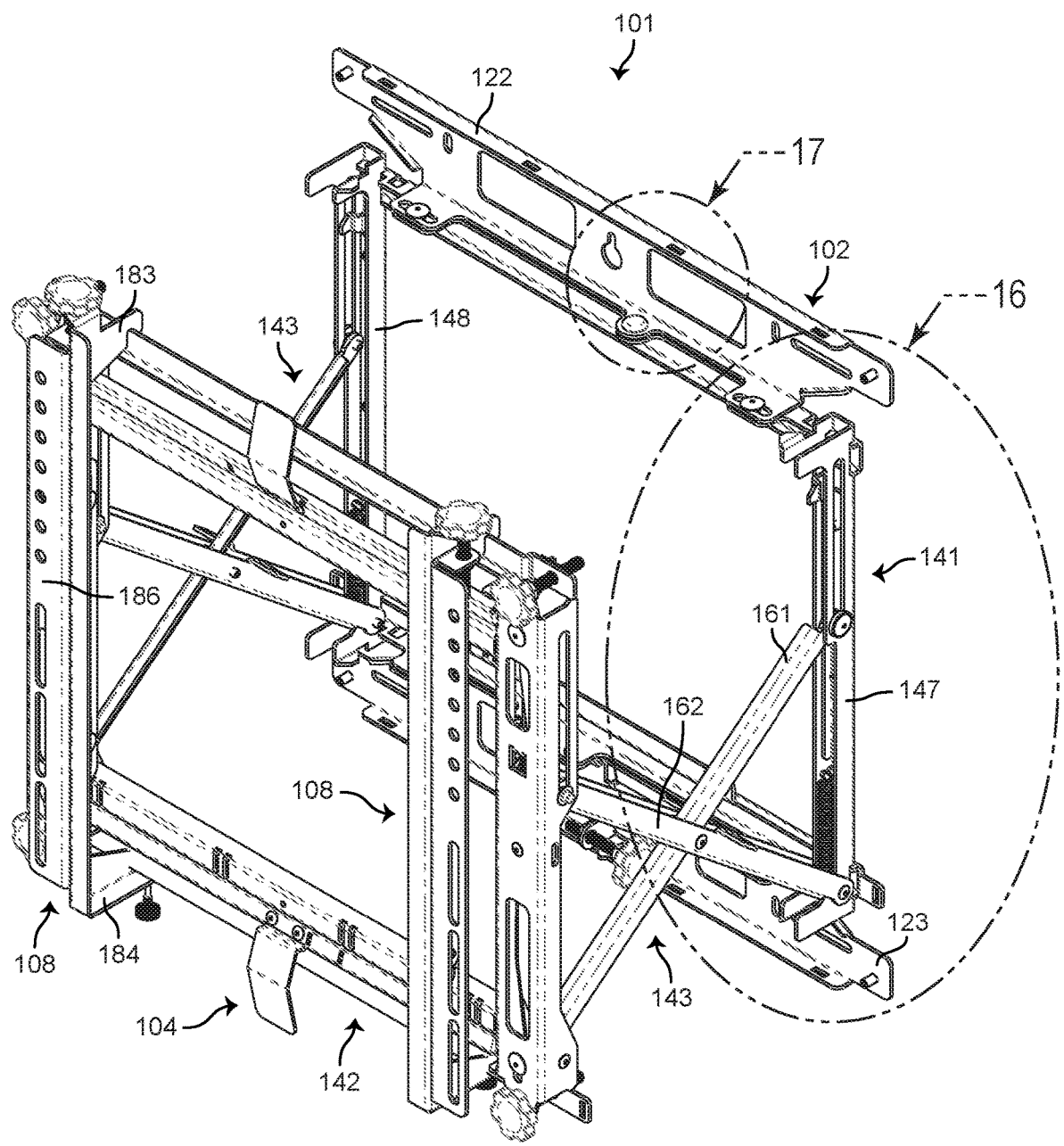
FIG. 2 is another perspective view of the mounting system of FIG. 1 configured in an extended position.
Figure 3:
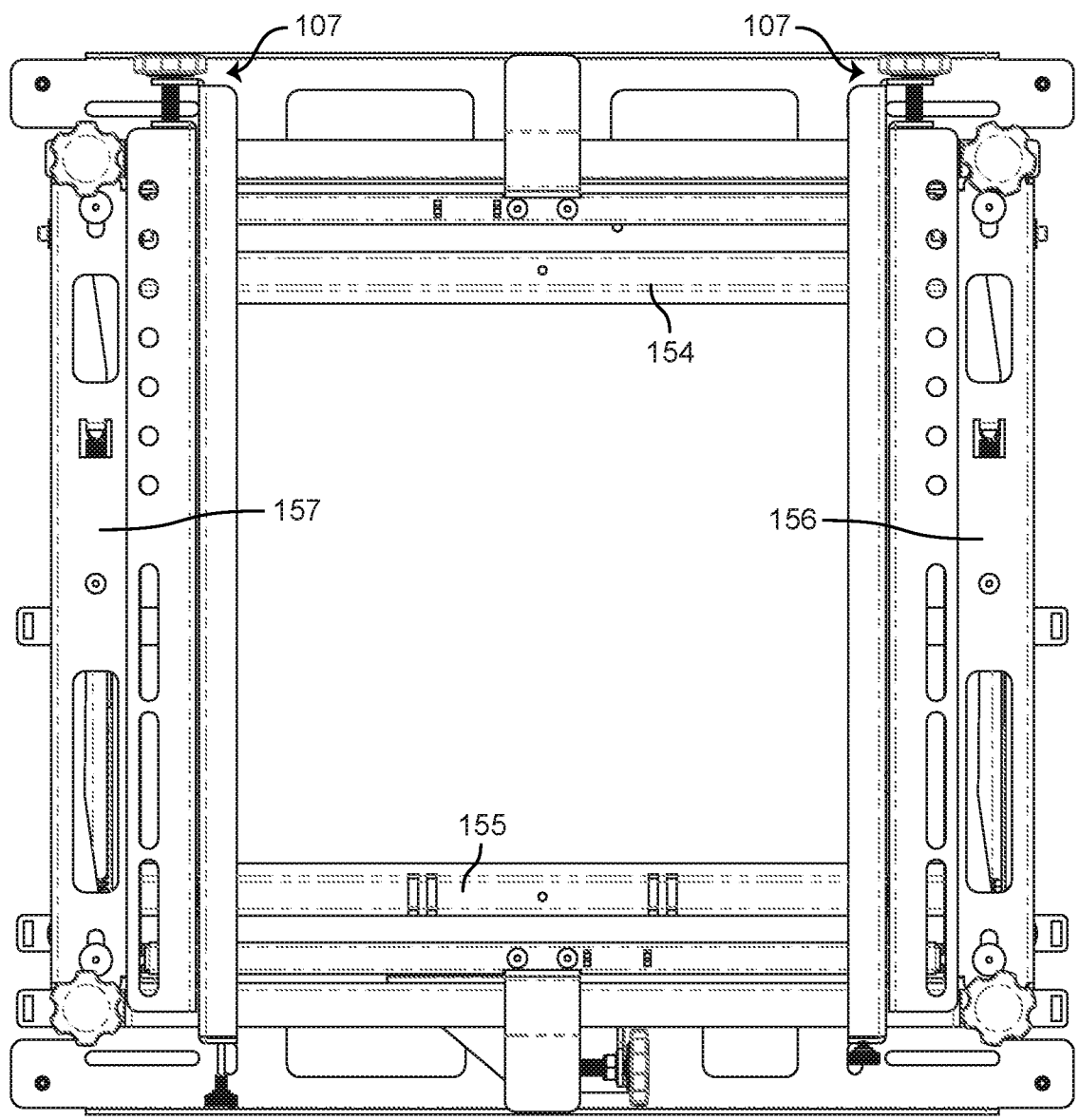
FIG. 3 is a front view of the mounting system of FIG. 1 configured in the collapsed position.
Figure 4:
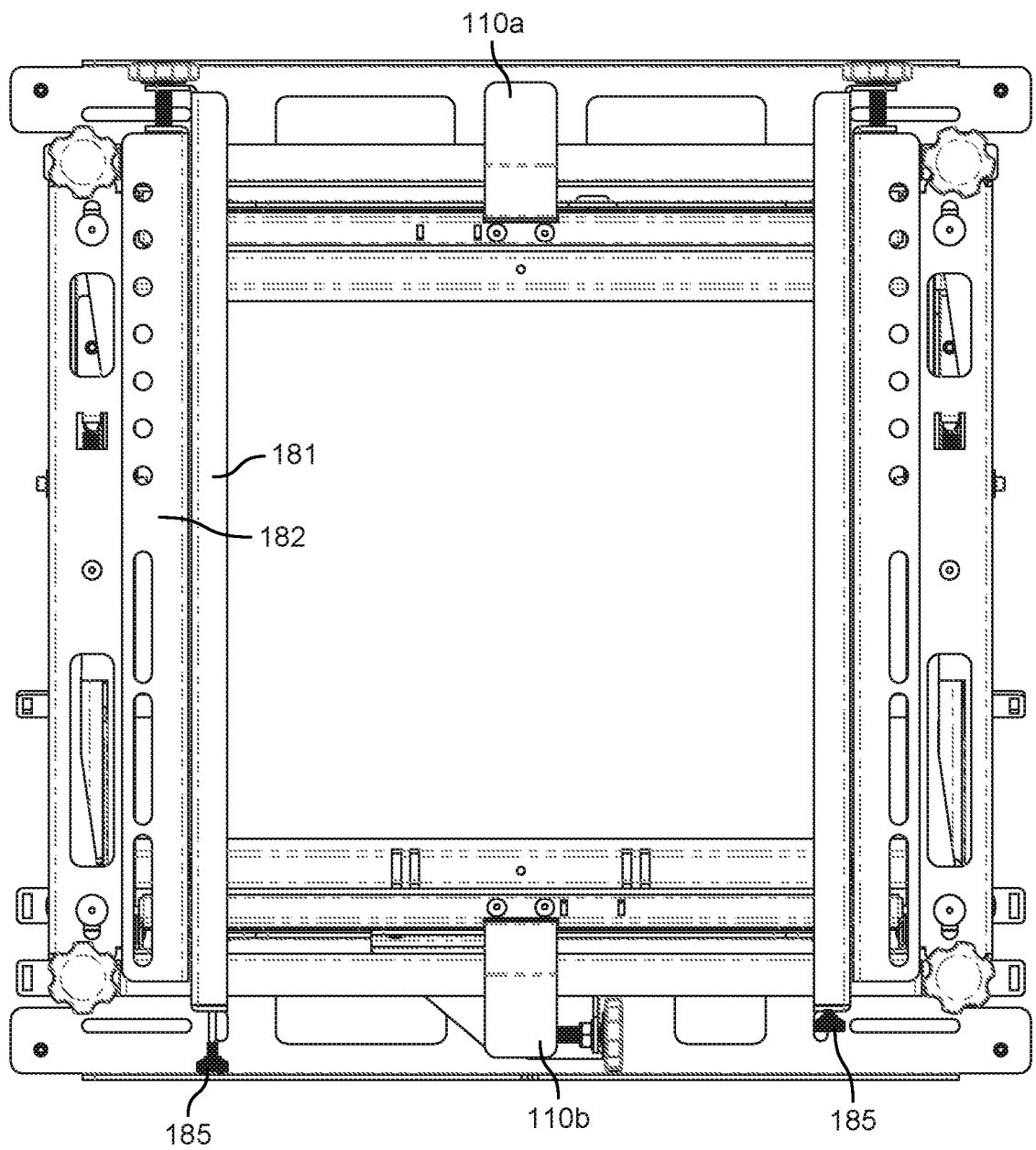
FIG. 4 is a front view of the mounting system of FIG. 1 configured in the extended position.
Figure 18:
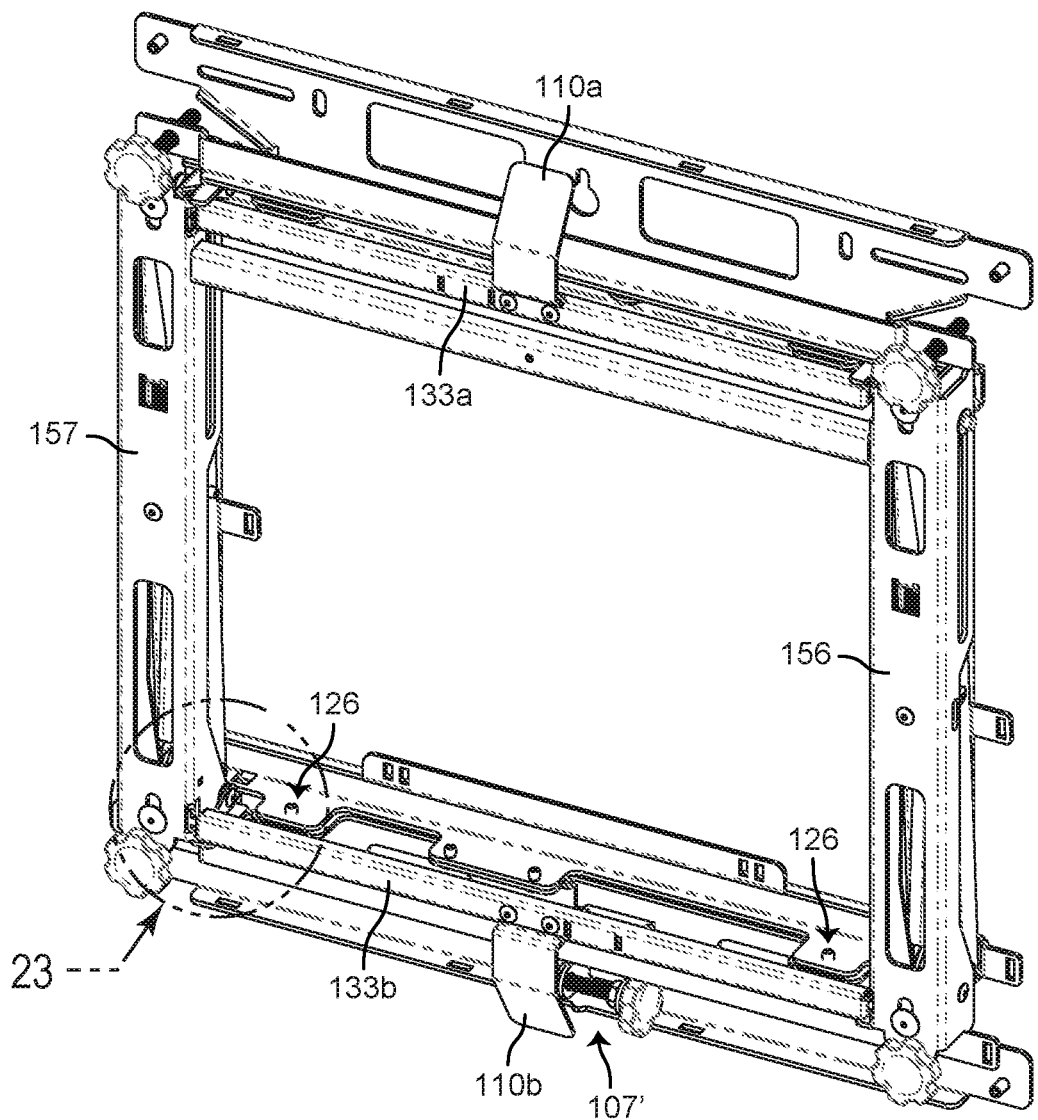
FIG. 18 is a perspective view of the mounting system of FIG. 1 configured in the collapsed position with an exemplary embodiment of a latch mechanism in a locking position.

The adjustment assembly 104 of the mounting system 101 is configured to provide adjustment of the display device attached to each device mount assembly 108 relative to the surface mount assembly 102. As shown best in FIGS. 2 and 19, the adjustment assembly 104 includes a first frame assembly 141, a second frame assembly 142, and a pair of extension assemblies 143 that are configured to allow relative adjustment between the first and second frame assemblies. For example, the first frame assembly 141 may be coupled to the surface mount assembly 102 and the second frame assembly 142 may be coupled to the one or more device mount assemblies 108, such that the second frame assembly and each device mount assembly may be moved between a first position (e.g., a collapsed position, a retracted position, etc.) and a second position (e.g., an extended position, an expanded position, etc.) by way of the extension assemblies 143. FIGS. 1 and 18 show the mounting system 101 in the collapsed position, while FIGS. 2 and 19 show the mounting system 101 in a fully extended position. It is noted that the adjustment assembly 104 may be configured to allow for the mounting system 101 to be positioned in any number of intervening positions (i.e., position between the fully extended and the collapsed positions).

The first frame assembly 141 includes one or more members that may be interconnected or separated from any other member. As shown best in FIGS. 6 and 19, the first frame assembly 141 includes an upper cross member 145, a lower cross member 146, a right side member 147, and a left side member 148. The members 145, 146, 147, 148 may form a generally rectangular frame. The members 145, 146, 147, 148 may be interconnected, such that the first frame assembly 141 may move together as a single element (e.g., relative to the surface mount). For example, each of the right and left side members 147, 148 may be coupled to each of the upper and lower cross members 145, 146.

The upper cross member 145 of the first frame assembly 141 includes a base and may include one or more flanges extending from the base. As shown in FIG. 19, a flange 150 extends from the base and includes a plurality of holes, where each hole is configured to receive one of the fasteners 111 that couple the upper cross member 145 to the upper mounting member 122 of the surface mount assembly 102 and/or the insert 112 that is configured to temporally fix the relative positions of the surface mount assembly 102 and the adjustment assembly 104, such as during installation. Each hole in the flange 150 may, as examples, be a round hole, a through hole, a threaded hole, an extruded hole, a combination thereof, or other suitable hole. For example, each hole may be a threaded hole with internal threads configured to mate with the threads of the fasteners 111.

The lower cross member 146 of the first frame assembly 141 includes a base and may include one or more flanges extending from the base. As shown in FIG. 19, a flange 151 extends from the base and includes a plurality of holes 152, where each hole is configured to receive one of the fasteners 111 that couple the lower cross member 146 to the lower mounting member 123 of the surface mount assembly 102.

The right side member 147 of the first frame assembly 141 includes a base and a flange (e.g., leg, extension, etc.) extending from each side of the base, such that the right side member 147 has a generally U-shaped or C-shaped cross section. At least one flange of the right side member 147 includes an opening for pivotally and/or slidably receiving a member of the extension assembly 143, as discussed in more detail below.

The left side member 148 of the first frame assembly 141 may be configured the same as, similar to (e.g., symmetrically opposite) or different than the right side member 147. For example, the left side member 148 may include a base and a flange (e.g., leg, extension, etc.) extending from each side of the base, such that the left side member 148 has a generally U-shaped or C-shaped cross section. The left side member 148 (e.g., at least one flange) may include an opening for pivotally and/or slidably receiving a member of the extension assembly 143, as discussed in more detail below.

The second frame assembly 142 includes one or more members that may be interconnected or separated from any other member. As shown best in FIGS. 3 and 20, the second frame assembly 142 includes an upper cross member 154, a lower cross member 155, a right side member 156, and a left side member 157. The members 154, 155, 156, 157 may form a generally rectangular frame. The members 154, 155, 156, 157 may be interconnected, such that the second frame assembly 142 may move together as a single element (e.g., relative to the first frame assembly 141). For example, each of the right and left side members 156, 157 may be coupled to each of the upper and lower cross members 154, 155.

The upper cross member 154 of the second frame assembly 142 may be configured as a plate, a tube, or have any suitable shape. The upper cross member 154 may include one or more flanges or other features. The upper cross member 154 may include a hole or a plurality of holes, where each hole is configured to receive a fastener, such as to provide adjustment between the upper cross member 154 and another element of the mounting system 101.

The lower cross member 155 of the second frame assembly 142 may be configured as a plate, a tube, or have any suitable shape. The lower cross member 155 may include one or more flanges or other features. The lower cross member 155 may include a hole or a plurality of holes, where each hole is configured to receive a fastener, such as to provide adjustment between the lower cross member 155 and another element of the mounting system 101.

Figure 19:
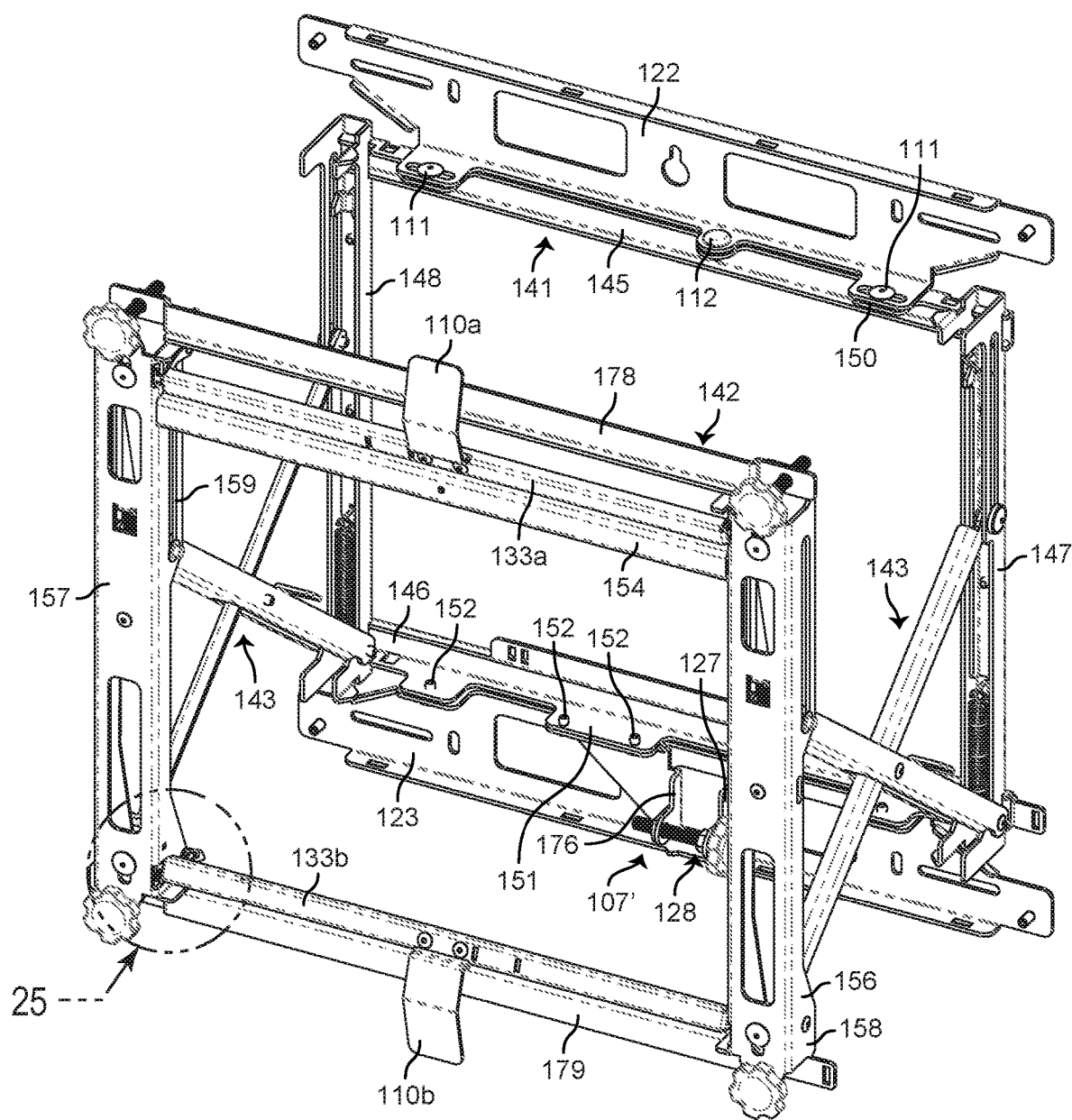
FIG. 19 is a perspective view of the mounting system of FIG. 1 configured in the extended position with the latch mechanism in a non-locking position.
Figure 20:
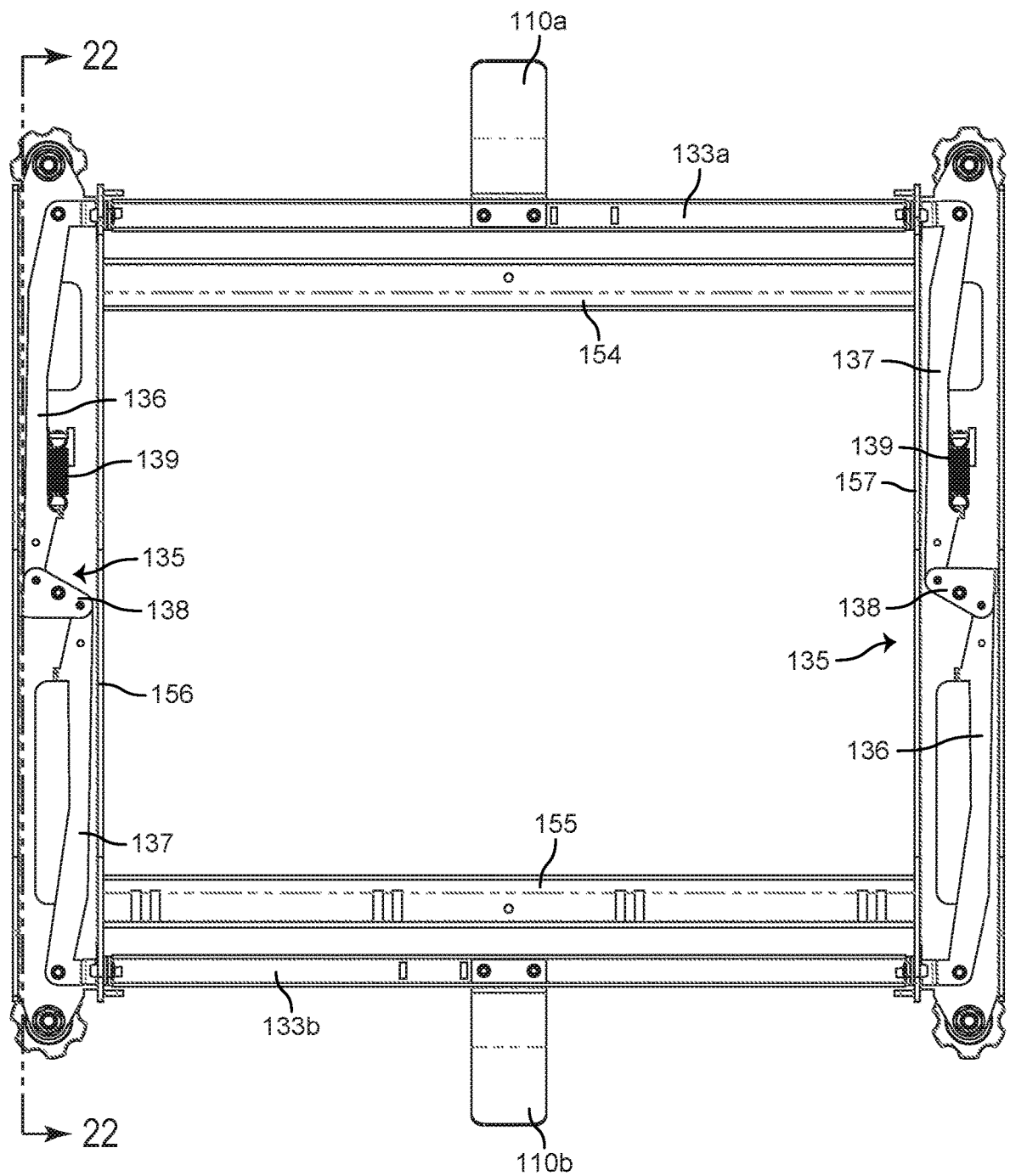
FIG. 20 is a rear view of the mounting system of FIG. 1, with a portion removed to see a portion of the latch mechanism in the locking position.

As shown in FIGS. 19 and 20, the right side member 156 of the second frame assembly 142 includes a base and a flange 158 (e.g., leg, extension, etc.) extending from each side of the base, such that the right side member 156 has a generally U-shaped or C-shaped cross section. At least one flange 158 of the right side member 156 includes an opening for pivotally and/or slidably receiving a member of the extension assembly 143, as discussed in more detail below.

The left side member 157 of the second frame assembly 142 may be configured the same as, similar to (e.g., symmetrically opposite) or different than the right side member 156. For example, the left side member 157 may include a base and a flange 159 (e.g., leg, extension, etc.) extending from each side of the base, such that the left side member 157 has a generally U-shaped or C-shaped cross section. The left side member 157 (e.g., at least one flange) may include an opening for pivotally and/or slidably receiving a member of the extension assembly 143, as discussed in more detail below.

Each extension assembly 143 includes one or more members that may be interconnected or separated from any other member. As shown best in FIG. 2, each extension assembly 143 include a first pivot member 161 and a second pivot member 162 that are configured to pivot (e.g., rotate) relative to one another to extend or collapse the extension assembly 143 (and the assemblies coupled to the extension assembly). As shown, the first and second pivot members 161, 162 rotate relative to one another in a scissor like manner to expand and collapse the second frame assembly 142 relative to the first frame assembly 141.

Figure 8:
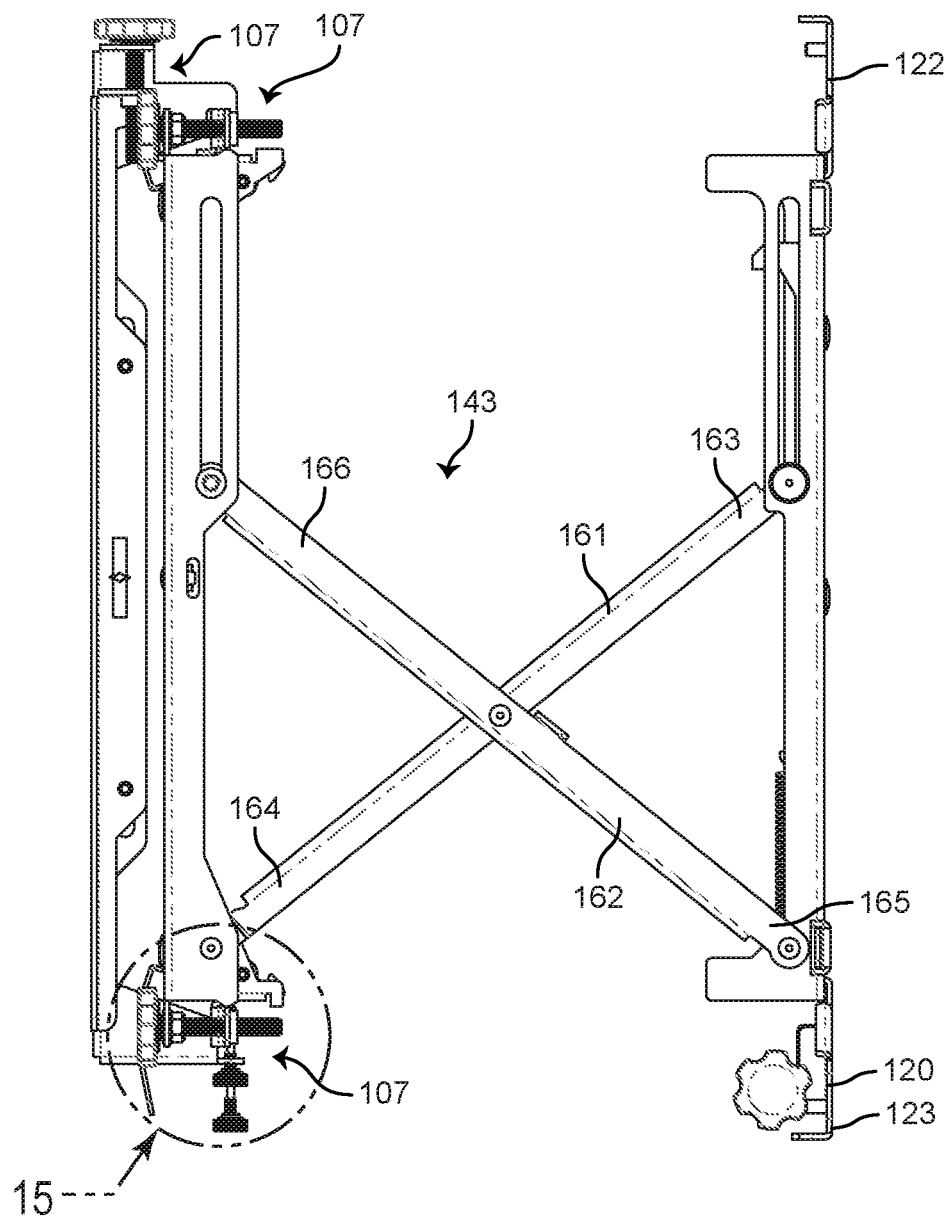
FIG. 8 is a right-side view of the mounting system of FIG. 1 configured in the extended position.
Figure 9:
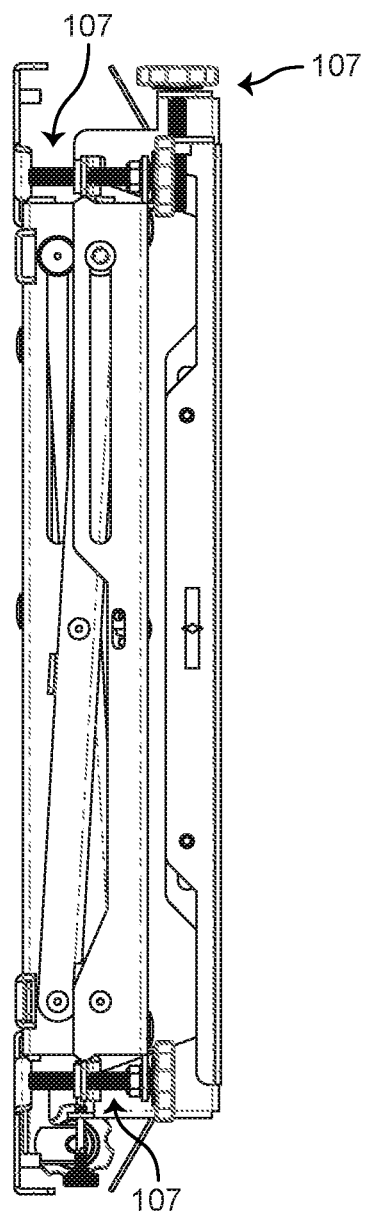
FIG. 9 is a left-side view of the mounting system of FIG. 1 configured in the collapsed position.
Figure 10:
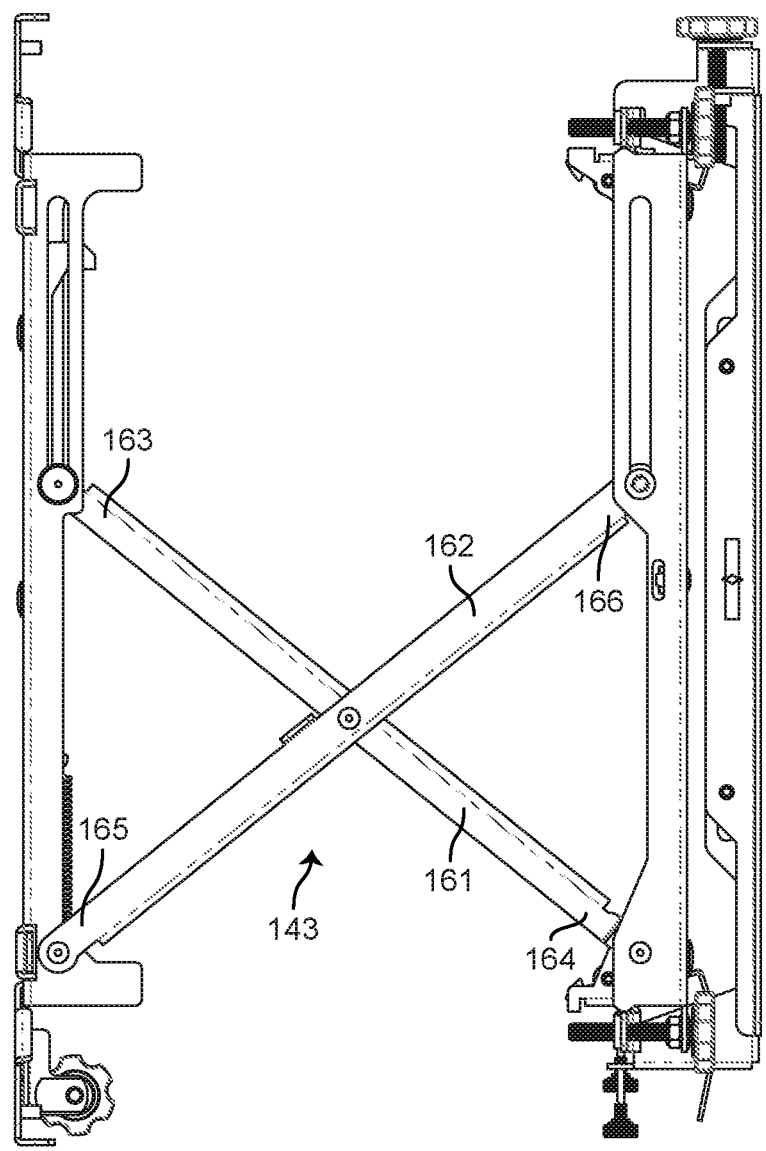
FIG. 10 is a left-side view of the mounting system of FIG. 1 configured in the extended position.

The first pivot member 161 of the extension assembly 143 may be configured as a plate, a bracket (e.g., having a C-shaped or U-shaped cross section), or have any suitable shape. As shown in FIG. 8, each first pivot member 161 has a first end 163 and a second end 164. The first end 163 of the first pivot member 161 is pivotally and slidably coupled to one of the side members (e.g., members 147, 148) of the first frame assembly 141 through a slot in a flange of the side member. The second end 164 of the first pivot member 161 is pivotally coupled to the corresponding side member (e.g., members 156, 157) of the second frame assembly 142. The ends 163, 164 of the first pivot member 161 may be coupled to the respective other members by way of pivot pins, fasteners, or any other suitable elements.

The second pivot member 162 of the extension assembly 143 may be configured as a plate, a bracket (e.g., having a C-shaped or U-shaped cross section), or have any suitable shape. As shown in FIG. 8, each second pivot member 162 has a first end 165 and a second end 166. The first end 165 of the second pivot member 162 is pivotally coupled to one of the side members (e.g., members 147, 148) of the first frame assembly 141. The second end 166 of the second pivot member 162 is pivotally and slidably coupled to the corresponding side member (e.g., members 156, 157) of the second frame assembly 142. The ends 165, 166 of the second pivot member 162 may be coupled to the respective other members by way of pivot pins, fasteners, or any other suitable elements.

The first pivot member 161 and the second pivot member 162 may be coupled (e.g., pivotally coupled) to one another. As shown in FIG. 8, the first pivot member 161 and the second pivot member 162 are pivotally coupled together at a location that is between the first and second ends of each pivot member. The pivot members 161, 162 may be pivotally coupled together by a pivot pin, a rivet, another type of fastener, or any suitable pivot element.

The adjustment assembly 104 may also include a spring assist mechanism that is configured to provide a force that assists in moving the first and second pivot members 161, 162 of the extension assembly 143. For example, the spring assist mechanism may be configured to provide an assist in moving the mounting system 101 toward the extended position (i.e., moving the second frame assembly 142 away from the first frame assembly 141).

Figure 5:
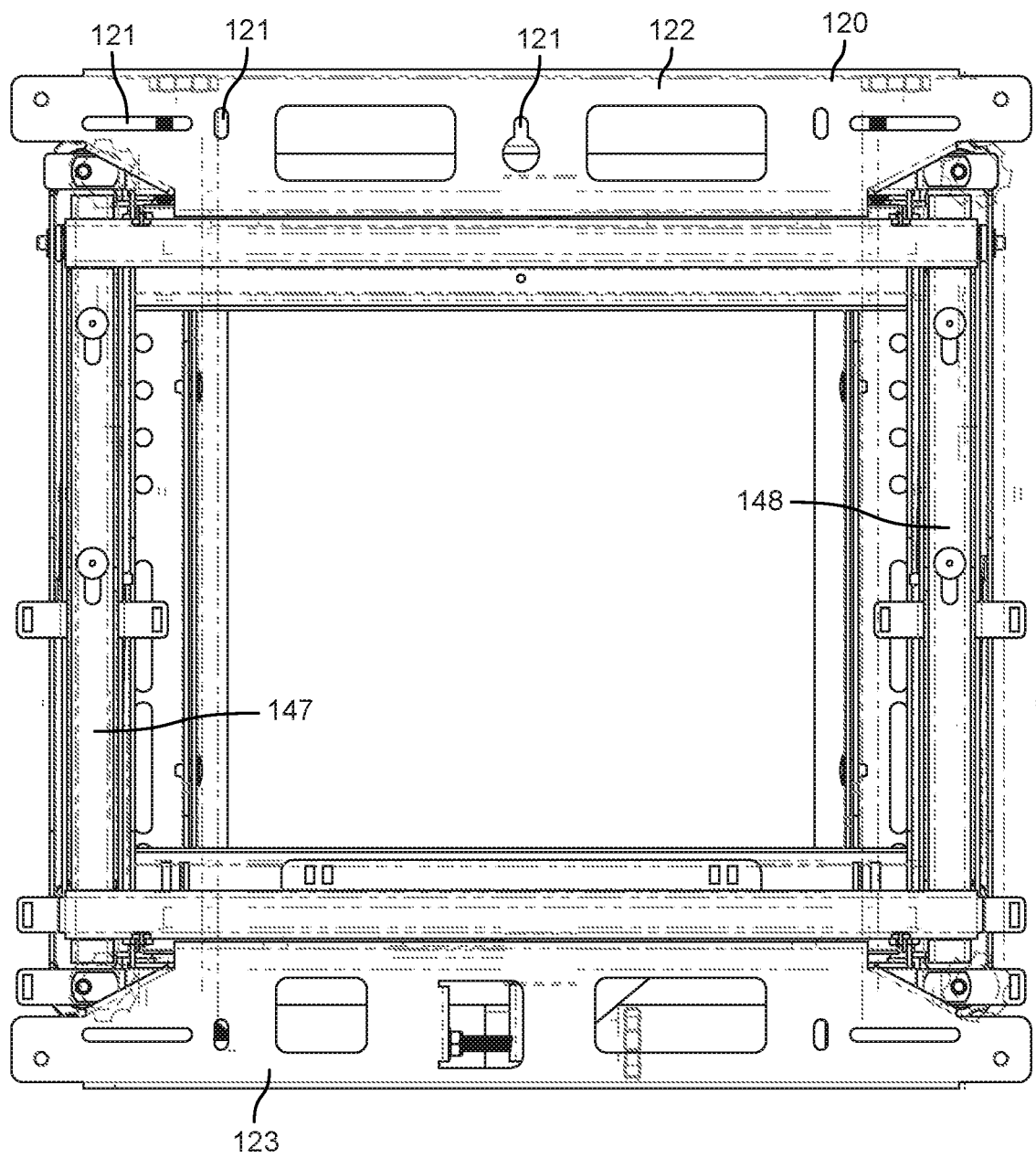
FIG. 5 is a rear view of the mounting system of FIG. 1 configured in the collapsed position.
Figure 6:
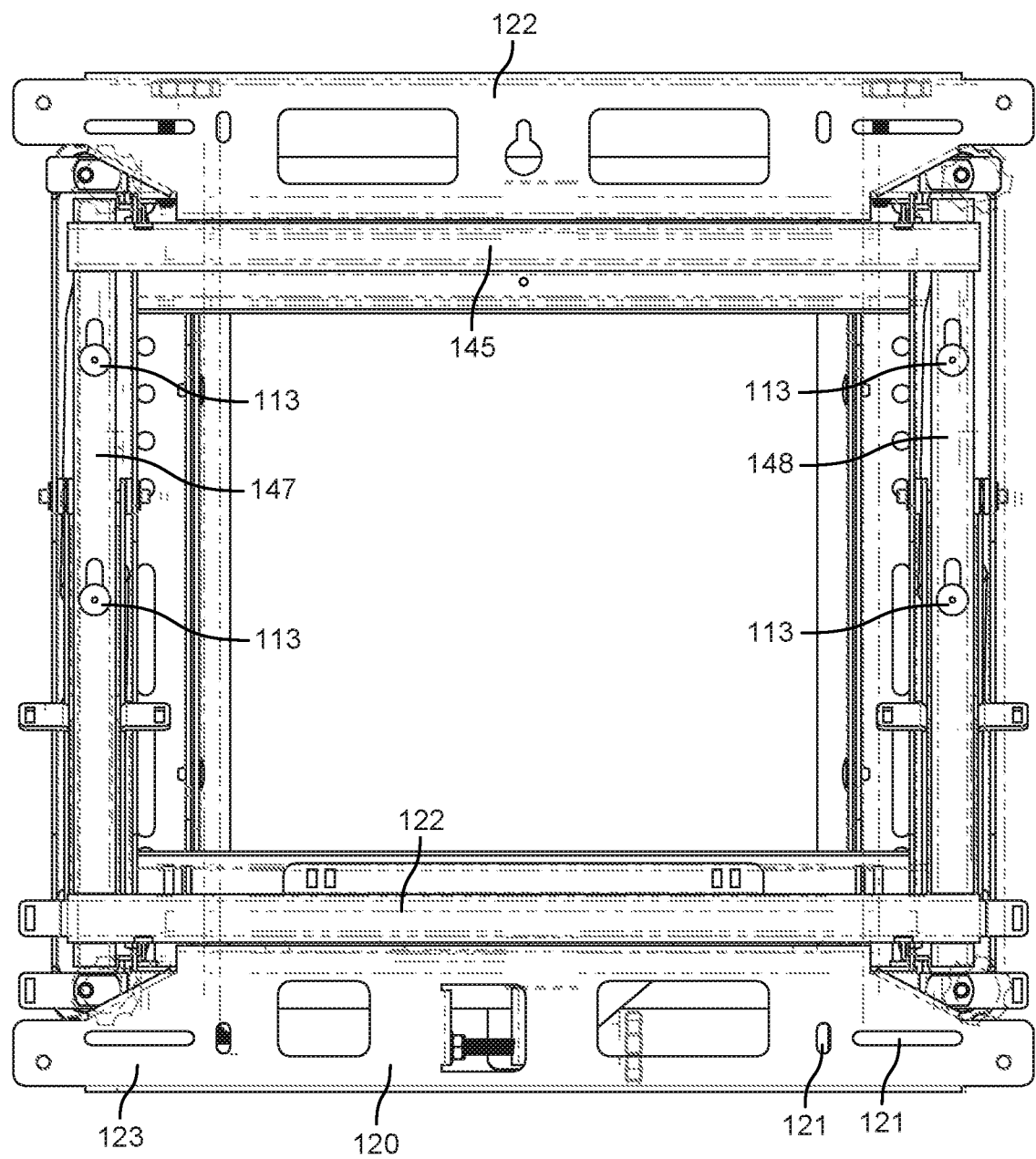
FIG. 6 is a rear view of the mounting system of FIG. 1 configured in the extended position.
Figure 7:
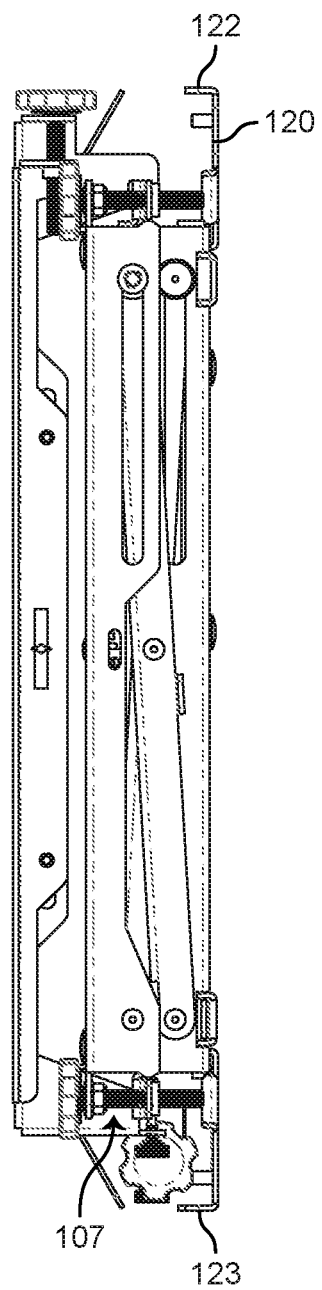
FIG. 7 is a right-side view of the mounting system of FIG. 1 configured in the collapsed position.
Figure 16:
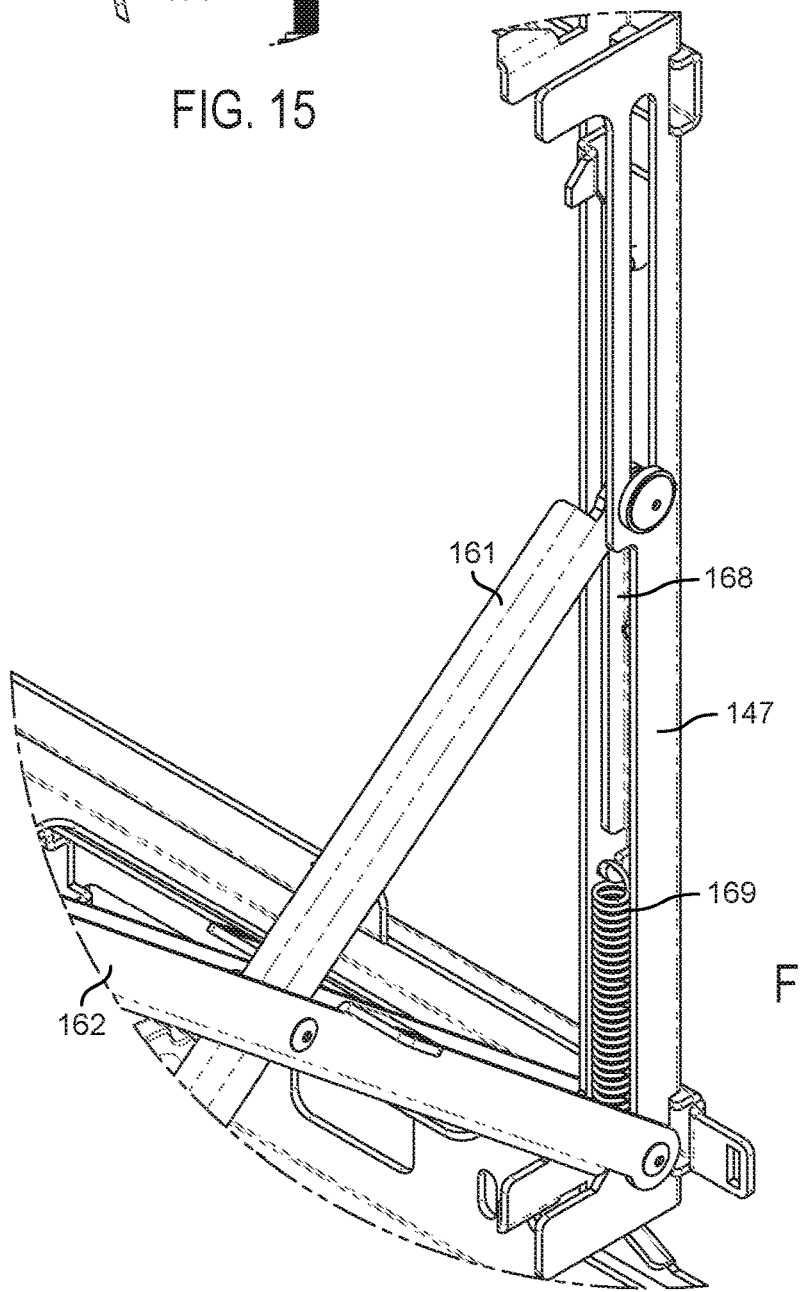
FIG. 16 is a detail view of a portion of the mounting system shown in FIG. 2.

As shown best in FIG. 16, the spring assist mechanism includes a spring assist bracket 168 and a spring 169. The spring assist bracket 168 is configured to move relative to the right side member 147 of the first frame assembly 141 for a predetermined length of travel during relative rotation between the first and second pivot members 161, 162. As shown in FIGS. 5 and 6, the spring assist bracket 168 is slidably coupled to the right side member 147 by way of fasteners 113, which are fixedly coupled (e.g., threaded, riveted, etc.) to the spring assist bracket 168, but pass through slots in the right side member 147. The length of the slots in the right side member 147 are configured to determine the total relative distance that the spring assist bracket 168 can move (e.g., slide) relative to the right side member 147. Thus, the duration of the spring assist can be tailored relative to the duration/length of the movement of the extension assemblies 143. Accordingly, the spring assist mechanism may be configured to provide a force that biases the second frame assembly 142 away from the first frame assembly 141 (i.e., during extending the adjustment assembly 104) during a predetermined length/percentage of the total travel of the adjustment assembly 104. For example, the biasing force may be applied in the extending direction from the initial release (e.g., of the latch mechanism) of the system until a set point (e.g., ¼ of the total travel, ⅓ of the total travel, ½ of the total travel, ⅔ of the total travel, etc.) that is short of full travel. As shown, the spring assist bracket 168 moves about $^{11}/_{16}$ inches (e.g., 0.5-1.0 inches) relative to the side member to limit the travel and the biasing force to the set point of movement of the system, which in-turn moves the second frame assembly 142 about 4 inches (e.g., 3-5 inches) due to the interaction between the spring assist bracket 168 and the extension assembly 143. FIGS. 5 and 6 show the fasteners 113 moving from an upper location in the slotted holes of the side member (corresponding to the collapsed position of the system) to a lower location in the slotted holes (corresponding to an extended position where the biasing force is no longer applied). This arrangement may advantageously assist in moving the system from the collapsed position toward an extended position, while not applying the additional force at the end of the travel of the system to avoid a "punching force" of the system (i.e., a relatively high force that could be imparted into a user or the system due to the increasing mechanical advantage as the system moves from the collapsed to the extended positions).

The spring 169 is configured to apply the biasing force to the spring assist mechanism to bias the adjustment assembly 104 and mounting system 101. As shown in FIG. 16, the spring 169 is configured as a coil spring (e.g., tension coil spring, helical spring, etc.) that includes a first end coupled to the spring assist bracket 168 and a second end coupled to the first frame assembly 141 (e.g., the side member 147, 148, the lower cross member 146, a fastener, etc.). When the system (e.g., the adjustment assembly 104) is moved from an extended position to the collapsed position, the spring 169 is extended to thereby store energy. When the system is moved from the collapsed position to an extended position, the stored energy is applied as the biasing force to help assist the movement of the assembly. The spring assist bracket 168 may include a tab (e.g., flange, hook, etc.) that is configured to retain an end (e.g., tang) of the spring 169.

A similarly configured spring assist mechanism may be employed with the other side of the surfaced mount assembly 102. In other words, a spring assist bracket 168 and a spring 169 may be coupled to the left side member 148 to provide additional spring force to the adjustment assembly 104. This second spring assist mechanism may be configured the same as, similar to, or different than the spring assist mechanism described above.

The second frame assembly 142 is configured to support (e.g., slidably support) a display device either directly or through one or more device mount assembly 108 coupled to the second frame assembly 142. For example, each device mount assembly 108 may be configured to couple to one or both of the upper and lower cross members 154, 155 of the second frame assembly 142, such that the device mount assembly 108 is adjustable (e.g., movable, slidable, etc.) relative to the second frame assembly 142. For example, each device mount assembly 108 may be slidably coupled to one or both of the upper and lower cross members 154, 155, such that the device mount assembly 108 (and a display device coupled thereto) may be adjustable in a lateral direction relative to the second frame assembly 142. According to another exemplary embodiment, each device mount assembly 108 is slidably coupled to the upper horizontal member 178 and/or the lower horizontal member 179 (see FIG. 19).

As shown in FIG. 1, each device mount assembly 108 includes an attachment bracket 181 and a support bracket 182. The attachment bracket 181 is configured to attach the device mount assembly 108 to the mounting system 101. As shown in FIG. 2, the attachment bracket 181 includes a hook 183 disposed on an upper end of the bracket that is configured to mount to the upper horizontal member 178 of the second frame assembly 142. The hook 183 includes a recess (e.g., notch, groove, etc.) that is configured to receive a portion (e.g., an edge) of the upper horizontal member 178 to secure the attachment bracket 181 to the upper horizontal member 178, while allowing the attachment bracket 181 to slide laterally relative to the upper horizontal member 178. Disposed on a lower end of the attachment bracket 181 is an arm 184 that extends below the lower horizontal member 179 and/or the lower cross member 155. A locking knob 185 may thread through a threaded opening in the arm 184, such that the threaded post may be adjustable into and out of engagement with the lower horizontal member 179 and/or another member, such as the lower cross member 155, to secure the device mount assembly 108 to the second frame assembly 142 (see FIGS. 2 and 4). Upon rotation of the locking knob 185, the post of the locking knob 185 can be moved into and out of engagement with the associated member (e.g., the lower horizontal member 179, the lower cross member 155, etc.). The attachment bracket 181 may include another suitable coupling element (e.g., a hook, a latch, etc.) disposed on the lower end of the bracket to help secure the device mount assembly 108 to the second frame assembly 142.

The support bracket 182 is configured to support a display device (e.g., the display device 99 shown in FIGS. 46-63) mounted to the support bracket 182. As shown in FIG. 2, each support bracket 182 includes a mounting surface 186 that is configured to support the display device. The mounting surface 186 may be a generally flat (e.g., planar) surface. One or more openings (e.g., holes, etc.) may be provided in the support bracket 182, such as through the mounting surface 186, to facilitate coupling the display device to the device mount assembly 108. Each support bracket 182 may be coupled to the attachment bracket 181. According to one example, the support bracket and the attachment bracket may be fixedly coupled. As shown, each support bracket 182 is adjustably coupled to the associated attachment bracket 181. For example, the support bracket 182 may be slidably coupled to the associated attachment bracket 181 by way of one or more fasteners (e.g., rivets, bolts, etc.) to allow the support bracket 182 to slide relative to the attachment bracket 181, such as along a longitudinal axis of the brackets (e.g., transverse to the lateral direction).

The mounting system 101 may include a latch mechanism that is configured to secure the system in one or more positions. As shown best in FIGS. 18 and 23, the latch mechanism is configured to secure the first and second frame assemblies 141, 142 together in the collapsed position. The latch mechanism includes a hook 130 (e.g., a latch, etc.) that is configured to engage an eyelet 129 or other form of opening, catch, etc.). The hook 130 is located on one of the first frame assembly 141 and the second frame assembly 142, while the eyelet 129 is located on the other assembly. As shown in FIGS. 18, 19, 23, and 24, the hook 130 is coupled to the second frame assembly 142 and the eyelet 129 is part of the first frame assembly 141.

As shown, the hook 130 of the latch mechanism is pivotally coupled to one of the side members (e.g., the right side member 156, the left side member 157) of the second frame assembly 142 by way of a pivot pin 131, such that the hook 130 is rotatable relative to the associated side member. The hook 130 is configured to rotate between a locking position, in which the hook 130 engages the eyelet 129 to secure the frame assemblies together, and a non-locking position, in which the hook 130 does not engage the eyelet 129 to allow the frame assemblies to be moved relative to one another, such as to adjust the mounting system 101 into an extended position.

As shown, the eyelet 129 of the latch mechanism in the depicted embodiment is configured as a slot provided in the flange 151 of the lower cross member 146 of the first frame assembly 141. The leading surface of the hook 130 (i.e., the surface that first makes contact with the lower cross member 146 when moving the hook into engagement with the eyelet) may be configured to rotate from the locking position to the non-locking position upon contact with the lower cross member 146 (e.g., the portion adjacent to the eyelet) to allow the hook 130 to be moved into a location to engage the eyelet 129. For example, the leading surface of the hook 130 may be configured to first contact an edge surface (e.g., the forward facing edge surface) of the flange 151 of the lower cross member 146. The leading surface has a geometry that drives the hook 130 open (i.e., out of engagement with the eyelet, rather than closed) upon further movement of the hook 130 into/along the flange 151 (and the eyelet 129). Once the hook 130 is in the proper location (e.g., the locking location shown in FIG. 23) the hook 130 is able to freely rotate into engagement with the eyelet 129, wherein the eyelet 129 retains the hook 130 (until released) to secure the first and second frame assemblies 141, 142 together.

The mounting system 101 may include a release mechanism that is configured to release (e.g., disengage) the latch mechanism, such as to allow the system to be moved to an extended position from the collapsed position. As shown generally in the FIGURES, the mounting system 101 includes a handle 110*a* (e.g., paddle, lever, etc.) that is positioned near the top of the system and another handle 110*b* that is positioned near the bottom of the system. It is noted that the mounting system may include only a single handle or may include more than two handles, but providing two handles as shown advantageously allows a user to release the latch mechanism from both above and below the system.

Figure 22:
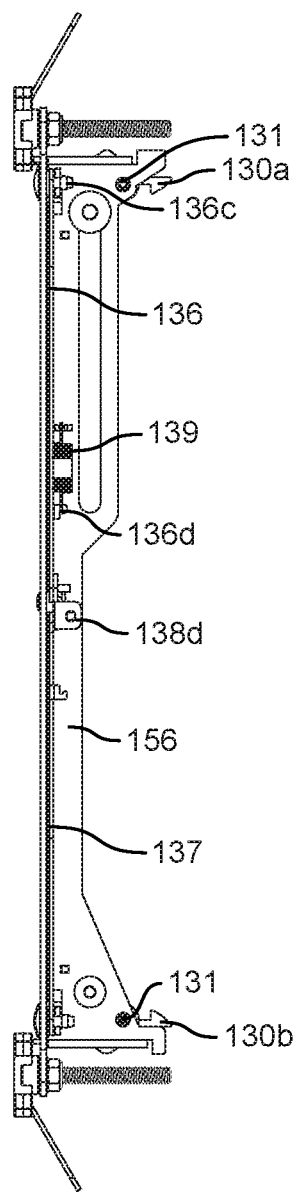
FIG. 22 is a partial sectional view of the mounting system shown in FIG. 20.
Figure 23:
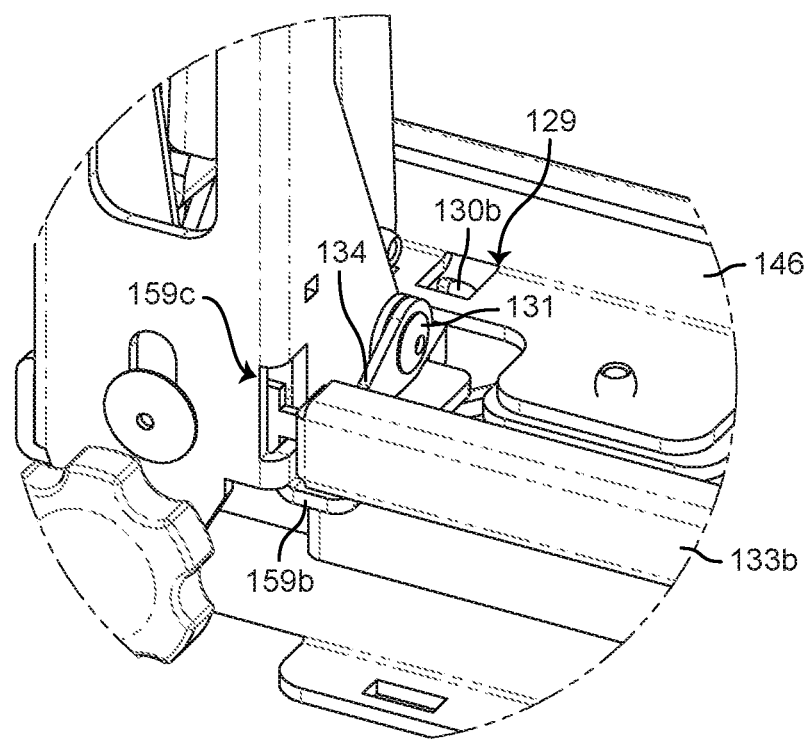
FIG. 23 is a detail view of a portion of the mounting system shown in FIG. 18.
Figure 24:
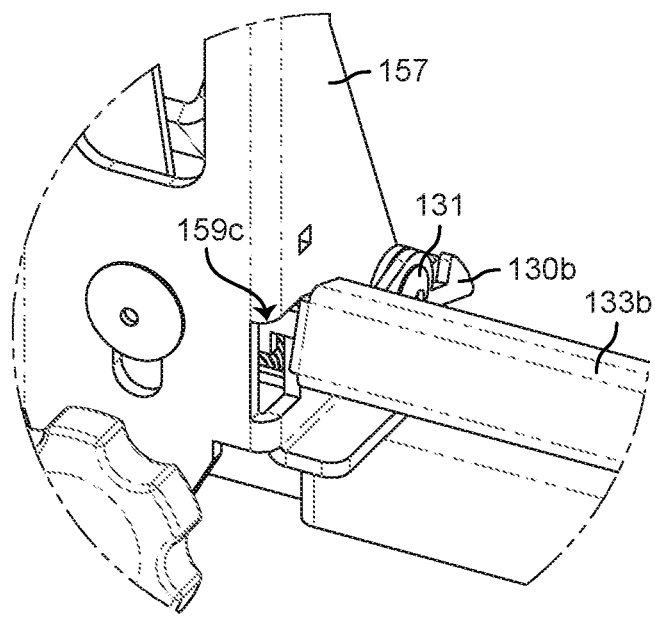
FIG. 24 is a detail view of a portion of the mounting system shown in FIG. 19.

FIGS. 18-24 illustrate each release mechanism of the mounting system 101, which includes the handle 110*a*, 110*b* and an associated release member 133*a*, 133*b* that is configured to communicate (e.g., transfer) motion of the handle 110*a*, 110*b* to the hook 130. As shown in FIGS. 18 and 19, each depicted release member 133*a*, 133*b* is configured as a cross tube that extends between the associated hook 130*a*, 130*b* (see FIG. 22) associated with the left side member 157 and the associated hook 130*a*, 130*b* associated with the right side member 156. For the systems employing only a single hook (e.g., associated with either side member), the release member 133*a*, 133*b* may be configured to only extend between the handle and the hook. The handle 110*a*, 110*b* is coupled to the associated release member 133a, 133b, such as, for example, using one or more fasteners. This way, motion imparted into the handle 110a, 110b is transferred to the associated release member 133a, 133b. As shown, the handle 110a, 110b is configured to rotate about a pivot axis that is generally defined by the pivot pin 131 (e.g., a center-point through the longitudinal axis of the pivot pin), which in-turn rotates the associated release member 133a, 133b a similar angular travel (e.g., rotation) about the pivot axis. As shown best in FIG. 23, an arm 134 may interconnect the hook(s) 130b and the release member 133b, such that rotation of the release member 133b in-turn rotates each hook 130b (e.g., a hook 130b associated with the left side member 157, a hook associated with the right side member 156), such as by a similar angular travel. The distance from the pivot axis to the handle and the distance from the pivot axis to the portion of the hook that engages the eyelet 129 may be tailored based on the system. FIG. 24 shows the release member 133b rotated to a position corresponding to the non-locking position of the hook 130b, such that the hook 130b does not engage the eyelet 129.

The mounting system 101 may include a first release member 133a (e.g., an upper release member) and a second release member 133b (e.g., a lower release member). The first release member 133a may be configured to move a first hook (e.g., the hook(s) 130a, see FIG. 22) to engage and disengage a first opening upon movement of the first release member 133a. The second release member 133b may be configured to move a second hook (e.g., the hook(s) 130b, see FIG. 22) to engage and disengage a second opening upon movement of the second release member 133b.

Each release mechanism may include a travel stop for limiting the angular travel of the release member 133a, 133b, the arm 134, and/or the hook 130a, 130b. According to one example, a travel stop is included to limit the travel of the release member 133a, 133b, the arm 134, and/or the hook 130a, 130b corresponding to the rotational direction in which the hook 130a, 130b engages the eyelet 129. Also for example, a travel stop may be configured to limit the movement of one or more of the link members 136, 137, 138 of the linkage assembly 135. Having a travel stop is advantageous, for example, when the mass of the release member 133a, 133b is greater than the mass of the hook(s) 130a, 130b to prohibit the over rotation of the hook and/or when the hook(s) 130a, 130b is/are biased in the locking direction, such as by a biasing member (e.g., a spring).

According to another exemplary embodiment, a second flange 159b of the left side member 157 that extends inwardly from the (first) flange 159 may be configured to act as a travel stop. The second flange 159b may be configured to limit the angular rotation (in the counterclockwise direction when looking from inside toward the outside at the arm 134) of the release member 133a, 133b (and/or the arm 134) to prohibit the hook 130a, 130b from over rotating to a point where the leading surface of the hook 130a, 130b can no longer first make contact with the lower cross member 146 at the proper location (e.g., an edge surface).

According to another example, a travel stop is included to limit the travel of the release member 133a, 133b, the arm 134, and/or the hook 130a, 130b corresponding to the rotational direction in which the hook 130a, 130b disengages the eyelet 129. For example, one or both of the side members (e.g., the right side member 156, left side member 157, etc.) of the second frame assembly 142 may be configured to act as a travel stop. As shown in FIGS. 23 and 24, an edge surface of a slot 159c in the flange 159 of one of the side members is configured to limit the angular rotation (in the clockwise direction when looking from inside toward the outside at the arm 134) of the release member 133b, a linkage thereto, and/or another element of the system (e.g., the arm 134). An opposite edge surface of the slot 159c may limit the angular rotation (in the counterclockwise direction). Thus, the slot 159c may be configured to allow the hook 130b to be rotated by an angular rotation that engages and disengages the hook 130b from the eyelet 129.

According to yet another example, the flange 159 of a side member may be configured to act as a travel stop for one or more of the link members 136, 137, 138 of the linkage assembly 135. For example, the third link member 138 may contact an inside of the flange (or a feature thereof) upon the predetermined amount of rotation. It is noted that other travel stops may be used to limit the rotation of the release system and those described in this application are not limiting.

The flange 159b of the side member (e.g., the right side member 156, left side member 157, etc.) may be used for other purposes as well. For example, the mounting system 101 may include an upper horizontal member 178 and a lower horizontal member 179 (see FIG. 19) configured to span between the right and left side members 156, 157. Each member 178, 179 may be configured to float on one or more of the flanges 159b, such as to allow for adjustment therebetween.

For the systems having more than one handle 110a, 110b, a linkage assembly may be employed to communicate rotation of one handle 110a to the other handle(s) 110b. As shown best in FIGS. 18 and 19, the mounting system 101 includes two handles 110a, 110b. An upper handle 110a is coupled to an upper release member 133a, which together allow for a user to release the latch mechanism(s) associated with the upper release member 133a, such as to reconfigure the system into an extended position, from above the system. A lower handle 110b is coupled to a lower release member 133b, which together allow for a user to release the latch mechanism(s) associated with the lower release member 133b, such as to reconfigure the system into an extended position, from below the system.

A linkage assembly is employed and configured to release the latch mechanism(s) associated with the upper release member 133a upon rotation of the lower handle 110b (and lower release member 133b). The same linkage assembly is also configured to release the latch mechanism(s) associated with the lower release member 133b upon rotation of the upper handle 110a (and upper release member 133a). Thus, the linkage assembly allows for release of all of the latch mechanisms of the mounting system 101 by actuating (e.g., rotating) a single handle 110a, 110b.

Figure 21:
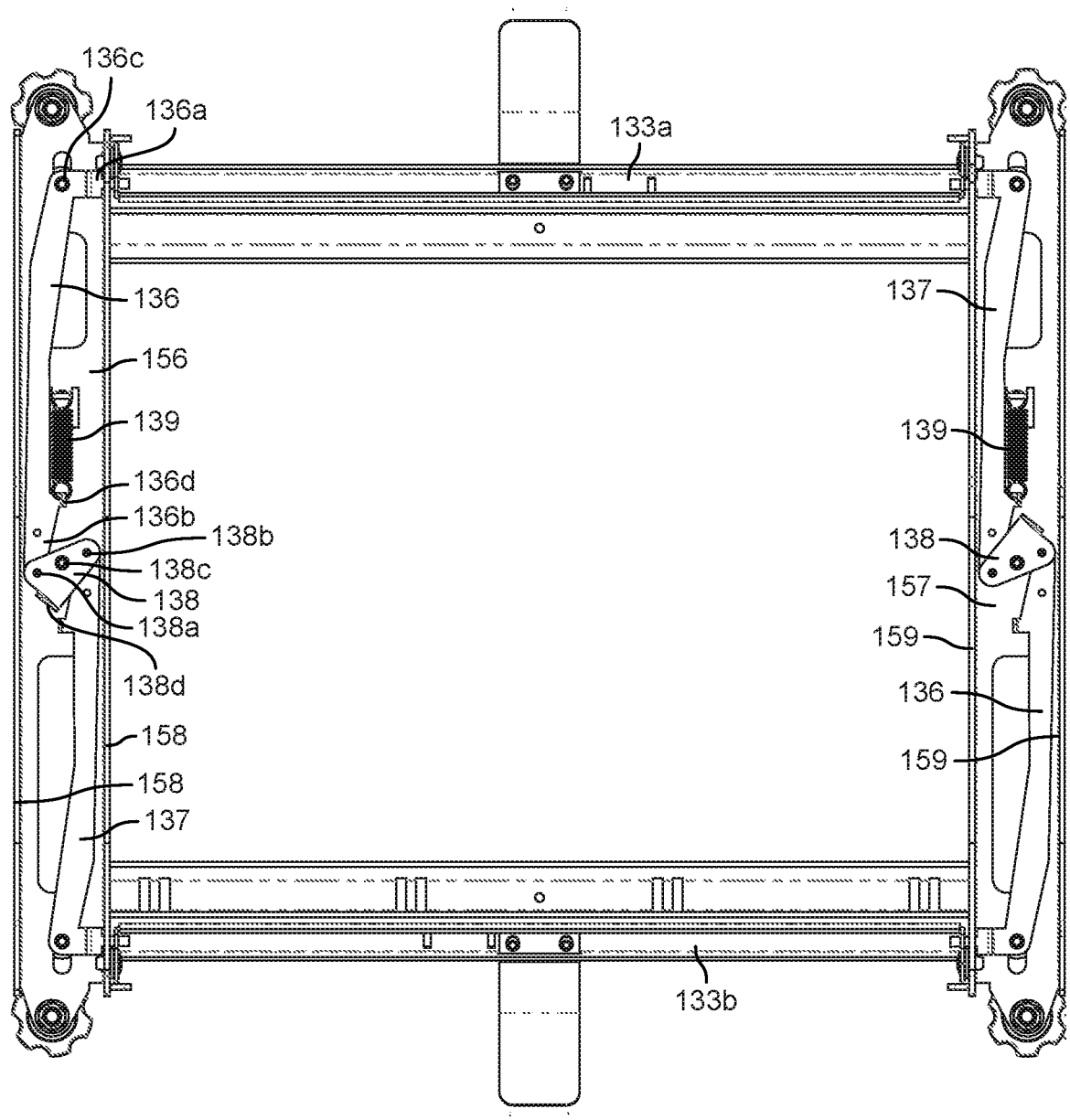
FIG. 21 is another rear view of the mounting system of FIG. 1, with a portion removed to see a portion of the latch mechanism in the non-locking position.

FIGS. 20-24 illustrate an exemplary embodiment of a linkage assembly 135. FIG. 20 illustrates the linkage assembly 135 in a locking position, in which the hook(s) 130a, 130b is/are able to engage the eyelet 129, while FIG. 21 illustrates the linkage assembly 135 in a non-locking position, in which the hook(s) 130a, 130b is/are disengaged from the eyelet 129. As shown in FIGS. 20 and 21, the mounting system 101 includes two linkage assemblies 135, with one (e.g., first) linkage assembly 135 connecting one (e.g., first) side of the upper release member 133a to one (e.g., first) side of the lower release member 133b, and the other (e.g., second) linkage assembly 135 connecting the other side (e.g., second) of the upper release member 133a to the other side (e.g., second) of the lower release member 133b. For example, the first linkage assembly 135 may be configured to connect to the right end of each release member 133a, 133b. The first linkage assembly 135 may be positioned (e.g., nested) within and/or operatively coupled to the right side member 156. Also for example, the second linkage assembly 135 may be configured to connect to the left end of each release member 133a, 133b. The second linkage assembly 135 may be positioned (e.g., nested) within and/or operatively coupled to the left side member 157.

Each linkage assembly 135 includes a first link member 136 connected to a release member 133a, 133b (see FIG. 20), a second link member 137 connected to another release member 133a, 133b, and a third (e.g., intermediate) link member 138 interconnecting the first and second link members 136, 137. Motion (e.g., sliding, rotation, etc.) imparted into one of the first and second link members 136, 137 is imparted to the other of the first and second link members 136,137 by way of the third link member 138. This way, when a user actuates one of the handles 110a, 110b, such as to release the latch mechanism(s), both of the release members 133a, 133b are actuated and moved together with the handle to release all of the latch mechanism(s). This arrangement advantageously allows a one-handed release all of the latch mechanism(s).

As shown in FIG. 21, the first link member 136 includes a first end 136a that is coupled to an end of a release member 133a, 133b, such that movement (e.g., rotation) of the release member 133a, 133b moves the first link member 136 through the coupled first end 136a. For example, the rotation of the release member 133a, 133b may move the first link member 136 in a generally linear direction (i.e., the rotation will rotate the first link member 136 along an arc length about the pivot axis, but the geometric arrangement of the arc is configured to maximize the linear movement). The first end 136a of the first link member 136 may extend through an opening (e.g., the slot 159c) in the associated frame member (e.g., a first frame member such as the right side member 156, a second frame member such as the left side member 157) to couple directly to the associated release member 133a, 133b. The opening may be located in a flange of the side member 156, 157.

The first link member 136 includes a second end 136b that is coupled to the third link member 138 to impart movement of the first link member 136 into the third link member 138. As shown, the second end 136b is pivotally coupled to the third link member 138, such that the generally liner movement of the first link member 136 pivots the third link member 138 through the coupling. The first link member 136 may also be coupled to the side member to help guide the movement of the first link member 136. As shown, a slide fastener 136c is coupled to the first link member 136 (e.g., proximate the first end 136a) and extends through a slot in the side member (e.g., the right side member 156) to guide the movement of the first link member 136 relative to the side member. The slide fastener 136c may include a head and a body, where the body extends through the slot and is coupled to the first link member 136. The head may be larger than the body and the slot to prevent the body from pulling through the slot. The first link member 136 may include a retaining element 136d, such as to retain a biasing element (e.g., a spring) that is configured to bias the first link member 136 relative to another element of the system, such as the side member. As shown, the retaining element 136d is configured as a tab that extends from the adjacent portion of the first link member to allow a tang of a spring 139 (e.g., an extension spring) to be coupled to (and retained by) the tab. Thus, as the first link member 136 moves, the spring either stores energy (e.g., by being stretched or put in tension) or releases energy (e.g., by being compressed or put in compression).

Also shown in FIG. 21, the second link member 137 is configured substantially symmetrically opposite to the first link member 136. Thus, the second link member 137 includes a first end that is coupled to an end of a release member 133a, 133b and a second end that is pivotally coupled to the third link member. The second link member 137 may be coupled to the respective side member by way of a slide fastener, such as the slide fastener 136c. The second link member 137 may also include a retaining element configured to retain another element/member of the system, such as a biasing element.

Also shown in FIG. 21, the third link member 138 includes a first end 138a that is pivotally coupled to the second end 136b of the first link member 136 through a pivot member (e.g., a first pivot member), a second end 138b that is pivotally coupled to the second end of the second link member 137 through a pivot member (e.g., a second pivot member), and a pivot member 138c (e.g., a third pivot member) pivotally coupling the third link member 138 to the respective side member (e.g., the right side member 156, the left side member 157). In this way, movement (e.g., translation, generally linear movement, etc.) of one of the first and second link members 136, 137 moves the other of the first and second link members 136, 137 via a rotation of the third link member 138. The third link member 138 may be pivotally coupled to a base of the associated side member 156, 157 to allow rotation of the third link member 138 relative to the associated side member 156, 157. Each pivot member may be a fastener, a rivet, a staked pin, or any other suitable element that allows for relative rotation between the link members. The third link member 138 may also include a travel stop that is configured to limit the rotational travel of the third link member 138 relative to the associated side member. As shown in FIGS. 20 and 22, a flange 138d extends from the main body of the third link member 138, such that a portion (e.g., edge, surface, etc.) the flange 138d contacts a portion of a flange of the associated side member to prevent further rotation of the third link member 138 in the direction of rotation.

During operation, when one of the first and second link members 136, 137 is moved by way of the connected release member 133a, 133b and associated handle 110a, 110b, the link member in-turn moves (e.g., pivots) the third link member 138, which in-turn moves the other of the first and second link member 136, 137, which in-turn moves the connected release member 133a, 133b. In this way, both release members 133a, 133b are opened by rotation of a single release member 133a, 133b, such as via a single handle 110a, 110b, thereby releasing all of the latch mechanism(s) at the same time.

The mounting system 101 may include one or more anti-backlash assemblies 107, where each anti-backlash assembly 107 is configured to reduce or eliminate the free-play (i.e., clearance between elements that can be perceived by a user as looseness) between two or more elements of the system. In FIG. 8, the mounting system is shown to include several anti-backlash assemblies 107. In application, an anti-backlash assembly 107 may be associated with any two elements/members that are configured to have relative movement or are not fixedly coupled together, such that free-play may be present.

Figure 15:
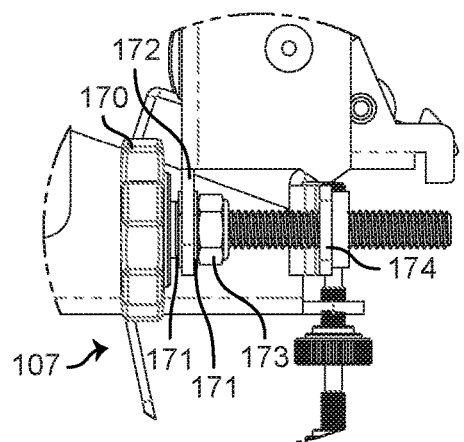
FIG. 15 is a detail view of a portion of the mounting system shown in FIG. 8.

As shown in FIG. 15, each anti-backlash assembly 107 includes an adjustment member 170, which may include a head (e.g., handle) and a threaded stud extending from the head. As shown, the head is configured to be rotated by a user to turn the threaded stud that extends concentrically from the head. Each anti-backlash assembly 107 may include one or more Belleville washers. As shown, the anti-backlash assembly 107 includes two washers 171 (e.g., Belleville washers), with the first washer 171 disposed between the head of the adjustment member 170 and a portion 172 of a first element. For example, the portion 172 may be a flange, extension, tab, plate, or any suitable feature of the first element. Also for example, the first element may be one of the side members of the second frame assembly 142 (e.g., the right side member 156, the left side member 157), such as for the example shown in FIG. 15. It is noted that the first element may be any other suitable element/member of the mounting system 101. The second washer 171 of the anti-backlash assembly 107 (shown in FIG. 15) is disposed between the portion 172 of the first element and a nut 173 (e.g., a lock nut, a stop nut, etc.). For example, an elastic stop nut may be employed. Each Belleville washer is configured to impart a biasing force due to its geometric shape that reduces or eliminates the free-play between the elements of the system. The threaded stud of the adjustment member 170 may thread through a portion 174 of a mating element, i.e., a second element of the assembly. For example, the second element may be one of the members of a device mount assembly, the second frame assembly, or any other suitable element/member. As shown in FIG. 15, the second element is the lower horizontal member 179. According to other examples, the second element may be other members, such as, for example, the lower cross member 155 of the second frame assembly 142. It is noted that the second element may be any other suitable element/member of the mounting system 101 (e.g., the upper horizontal member 178, the upper cross member 154, etc.).

As shown best in FIGS. 18 and 19, an anti-backlash assembly 107' has an adjustment member (e.g., the adjustment member 170c shown in FIG. 1) that threads through one or more spaced apart flanges 127 of the lower mounting member 123 and into a flange of a bracket 176. The bracket 176, according to one example, is fixedly coupled to the flange 151 of the lower cross member 146 of the first frame assembly 141, such as by one or more fasteners through holes 152 in the flange 151. The lower mounting member 123 may include clearance holes (e.g., slots) to permit movement (e.g., lateral movement) of the lower cross member 146 and the bracket 176 relative to the lower mounting member 123. The anti-backlash assembly 107' may be configured to eliminate or reduce the free-play between these elements. The anti-backlash assembly 107' may also provide for fine adjustment (e.g., lateral movement over a relatively short distance) of the lower cross member 146 and the bracket 176 relative to the lower mounting member 123.

Figure 46:
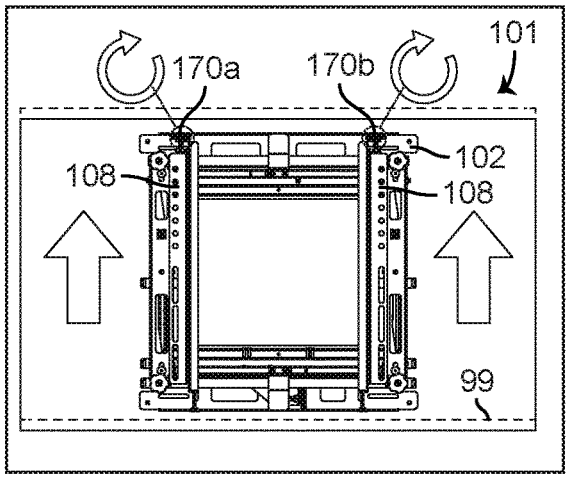
FIG. 46 is a front view of the mounting system of FIG. 1, showing an upward adjustment of the attached display device.
Figure 47:
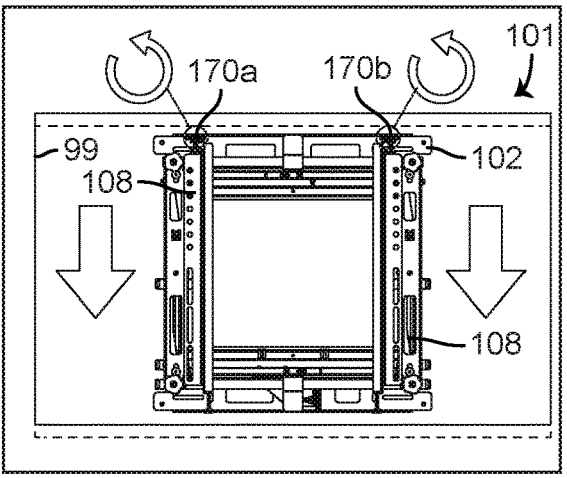
FIG. 47 is a front view of the mounting system of FIG. 1, showing a downward adjustment of the attached display device.

As shown best in FIGS. 1, 2, and 18, the mounting system 101 includes a plurality of adjustment members 170a, 170b, 170c, 170d, 170e, 170f, 170g, etc. for providing a plurality of different ways to adjust the system, such as to adjust the position of the display device mounted to the system. As shown in FIG. 46, rotation of both a first adjustment member 170a and a second adjustment member 170b in a first rotational direction (e.g., clockwise) moves the device mount assemblies 108 in an upward direction to adjust the display device 99 upwardly (e.g., relative to the surface mount assembly 102) as shown by the arrows and the dashed lines showing the relative movement of the display device 99. As shown in FIG. 47, rotation of both the first and second adjustment members 170a, 170b in a second rotational direction (e.g., counterclockwise) moves the device mount assemblies 108 in a downward direction to adjust the display device downwardly, such as relative to the surface mount assembly 102 (again, depicted by the arrows and the dashed lines, which are intended to show only a general movement and are not limiting, such as in magnitude). By way of example, rotation of one of the first and second adjustment members 170a, 170b may be configured to move the display device 99 by moving the associated support bracket 182 relative to the associated attachment bracket 181. With reference to FIG. 1, rotation of the first adjustment member 170a may move the support bracket 182 (shown as the left such bracket) relative to the associated attachment bracket 181. Similarly, with reference to FIG. 1, rotation of the second adjustment member 170b may move the support bracket 182 (shown as the right such bracket) relative to the associated attachment bracket 181.

Figure 48:
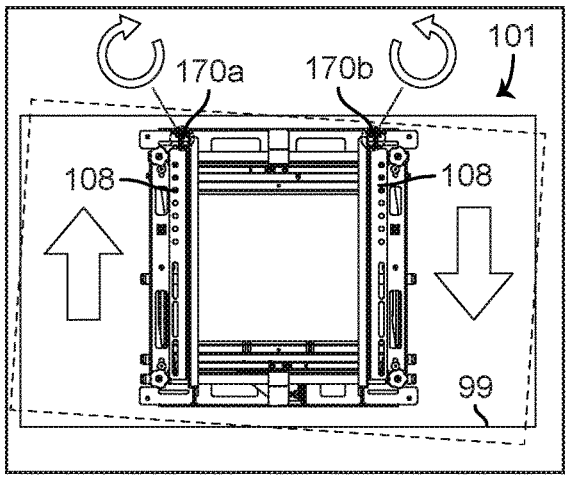
FIG. 48 is a front view of the mounting system of FIG. 1, showing a first tilting adjustment of the attached display device.
Figure 49:
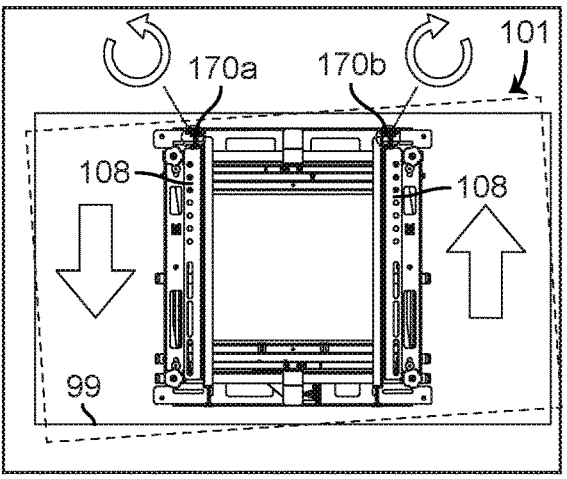
FIG. 49 is a front view of the mounting system of FIG. 1, showing a second tilting adjustment of the attached display device.

Furthermore, rotation of one of the first and second adjustment members 170a, 170b in the first direction and rotation of the other of the first and second adjustment members 170a, 170b in the second direction tilts the display device coupled to the device mount assemblies 108. As shown in FIG. 48, clockwise rotation of the first adjustment member 170a and counterclockwise rotation of the second adjustment member 170b may tilt the display device (e.g., about a roll axis) by raising the side (e.g., end, etc.) of the display device 99 associated with the first adjustment member 170a (shown as the left side), such as by raising the device mount assembly 108 associated with the first adjustment member 170a, and lowering the side of the display device 99 associated with the second adjustment member 170b (shown as the right side), such as by lowering the device mount assembly 108 associated with the second adjustment member 170b. As shown in FIG. 49, counterclockwise rotation of the first adjustment member 170a may lower the device mount assembly 108 (and side of the display device 99) associated with the first adjustment member 170a and clockwise rotation of the second adjustment member 170b may raise the device mount assembly 108 (and side of the display device 99) associated with the second adjustment member 170b, to tilt the display device 99. The dashed lines are intended to illustrate the general movement of the display device 99 and, as noted above, are not limiting in nature (e.g., in magnitude).

Figure 50:
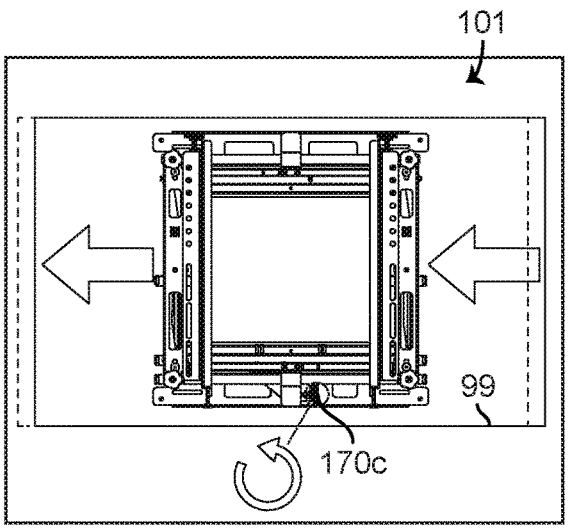
FIG. 50 is a front view of the mounting system of FIG. 1, showing a first lateral adjustment of the attached display device.
Figure 51:
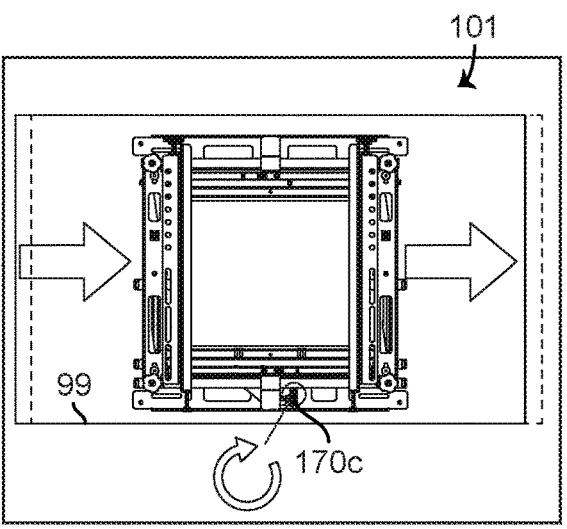
FIG. 51 is a front view of the mounting system of FIG. 1, showing a second lateral adjustment of the attached display device.

The third adjustment member 170c is configured to adjust the display device 99 in a lateral direction relative to a member that mounts to a mounting surface (e.g., the lower mounting member 123, the upper mounting member 122, etc.). As shown in FIG. 51, rotation of the third adjustment member 170c in a first direction (e.g., clockwise) moves the display device 99 in a first lateral direction, such as from left to right (when facing the display device 99). As shown in FIG. 50, rotation of the third adjustment member 170c in a second direction (e.g., counterclockwise) moves the display device in a second lateral direction, such as from right to left (when facing the display device 99). The third adjustment member 170c may move the display device 99 by, for example, moving the bracket 176 relative to the lower mounting member 123, as discussed above. By way of example, rotation of the third adjustment member 170c in a first direction (e.g., a first rotation direction) may be configured to move the display device 99 by moving the second frame assembly 142 relative to the first frame assembly 141 in a first lateral direction (e.g., right to left), and rotation of the third adjustment member 170c in a second direction (e.g., opposite rotational direction to the first direction) may be configured to move the display device 99 by moving the second frame assembly 142 relative to the first frame assembly 141 in a second lateral direction (e.g., left to right) that is opposite to the first lateral direction.

The fourth, fifth, sixth, and seventh adjustment members 170d, 170e, 170f, 170g are configured to move the display device 99 along the roll axis (e.g., translation in a fore and aft direction), rotate the display device 99 about a pitch axis, or rotate the display device 99 about a yaw axis. As shown in FIGS. 52 and 53, the display device 99 can be translated outward relative to a first frame assembly 141, such as the surface mount assembly 102, upon rotation of each of the fourth, fifth, sixth, and seventh adjustment members 170d, 170e, 170f, 170g in a first direction (e.g., clockwise) by the same amount. As shown in FIGS. 54 and 55, the display device 99 can be translated inward relative to a first frame assembly 141, such as the surface mount assembly 102, upon rotation of each of the fourth, fifth, sixth, and seventh adjustment members 170d, 170e, 170f, 170g in a second direction (e.g., counterclockwise) by the same amount.

Adjustment of the display device about a yaw axis (e.g., vertical axis, up and down axis, etc.) can be achieved by rotation of the fourth and sixth adjustment members 170d, 170f in a first direction by a first amount and/or rotation of the fifth and seventh adjustment members 170e, 170g in a second direction (opposite the first direction) by a second amount. As shown in FIGS. 56 and 57, if the first direction is clockwise rotation and the second direction is counterclockwise rotation, then the side of the display device 99 associated with the fourth and sixth adjustment members 170d, 170f may move outwardly while the side of the display device associated with the fifth and seventh adjustment members 170e, 170g may move inwardly. Conversely, as shown in FIGS. 58 and 59, if the first direction is counterclockwise rotation and the second direction is clockwise rotation, then the side of the display device 99 associated with the fourth and sixth adjustment members 170d, 170f may move inwardly, while the side of the display device associated with the fifth and seventh adjustment members 170e, 170g may move outwardly.

Adjustment of the display device about a pitch axis (e.g., horizontal axis, side to side axis, etc.) can be achieved by rotation of the fourth and fifth adjustment members 170d, 170e in a first direction by a first amount and/or rotation of the sixth and seventh adjustment members 170f, 170g in a second direction (opposite the first direction) by a second amount. As shown in FIGS. 60 and 61, if the first direction is counterclockwise rotation and the second direction is clockwise rotation, then the upper portion (e.g., the top) of the display device 99 that is associated with the fourth and fifth adjustment members 170d, 170e may move inwardly while the lower portion (e.g., the bottom) of the display device 99 associated with the sixth and seventh adjustment members 170f, 170g may move outwardly. Conversely, as shown in FIGS. 62 and 63, if the first direction is clockwise rotation and the second direction is counterclockwise rotation, then the upper portion of the display device 99 that is associated with the fourth and fifth adjustment members 170d, 170e may move outwardly while the lower portion of the display device 99 associated with the sixth and seventh adjustment members 170f, 170g may move inwardly.

Figure 25:
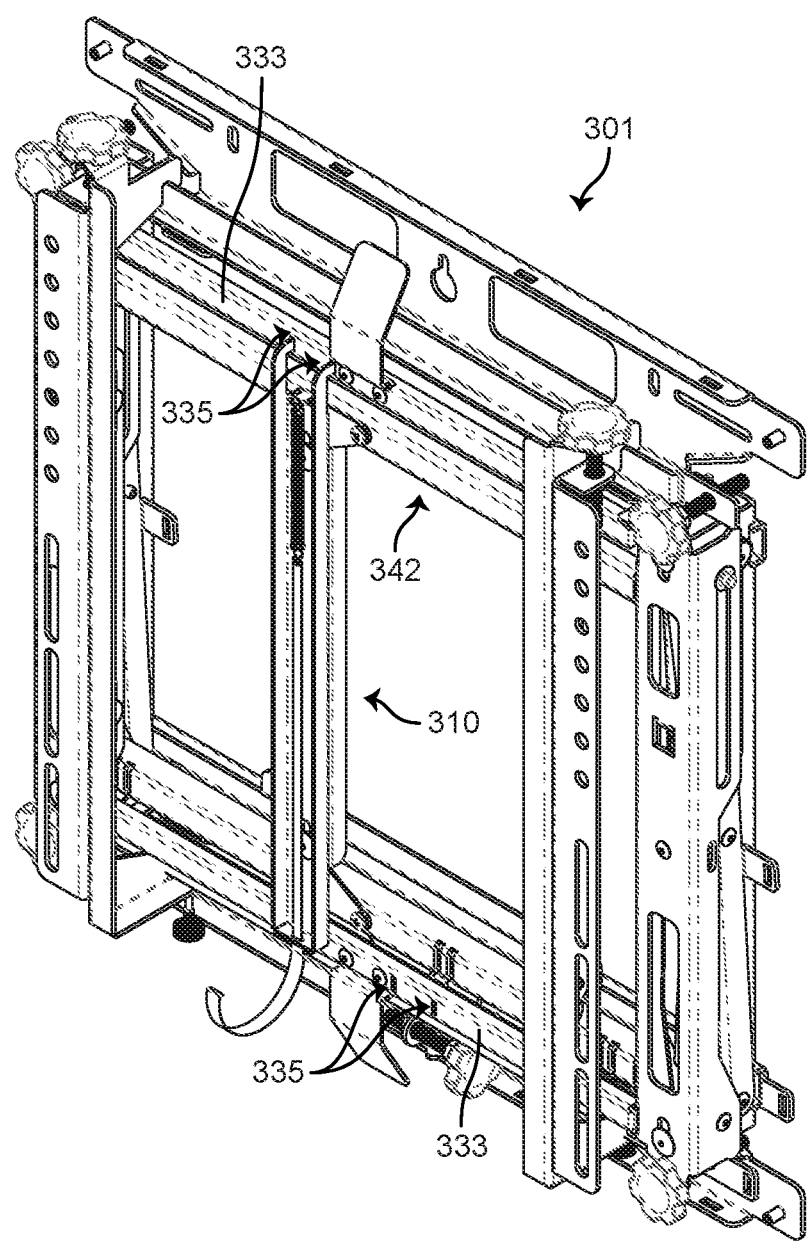
FIG. 25 is a perspective view of another exemplary embodiment of a mounting system, shown in a collapsed position.

FIGS. 25-42 illustrate an exemplary embodiment of a mounting system 301. The mounting system 301 may be configured the same as, similar to, or different than the mounting system 101. As shown in FIGS. 25 and 28, the mounting system 301 is basically the same as the mounting system 101, except it further includes a quick release mechanism 310. The release mechanism 310 is configured to allow for release of the system, such as for moving the mounting system 301 from a collapsed position to an extended position, from the front (e.g., facing a display device mounted to the system). The release mechanism 310 engages the release member 333, which may be configured the same as, similar to, or different than the release member 133a, 133b of the mounting system 101. As shown in FIGS. 25 and 28, the release member 333 is configured the same as the release member 133a, 133b described above, except the release member 333 further includes one or more openings 335, where each opening 335 is configured to receive a portion of the release mechanism, as described in more detail below, in order to rotate the release member 333 when the release mechanism 310 is actuated.

Figure 26:
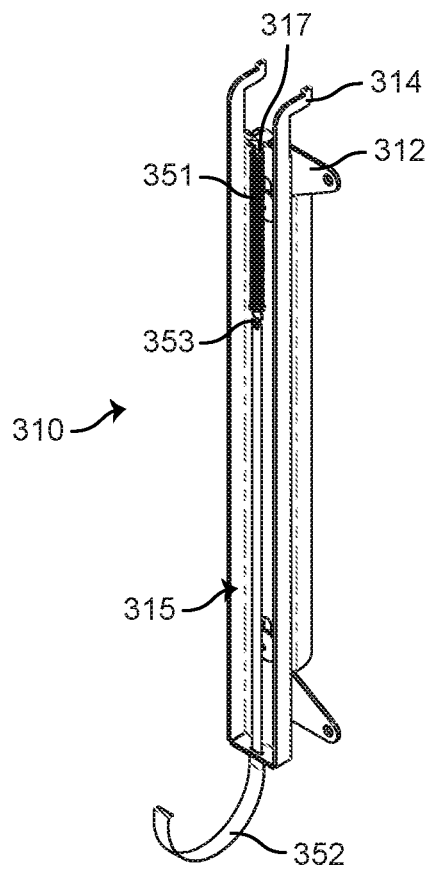
FIG. 26 is a perspective view of an exemplary embodiment of a release mechanism of the mounting system of FIG. 25, shown in a locking position.
Figure 27:
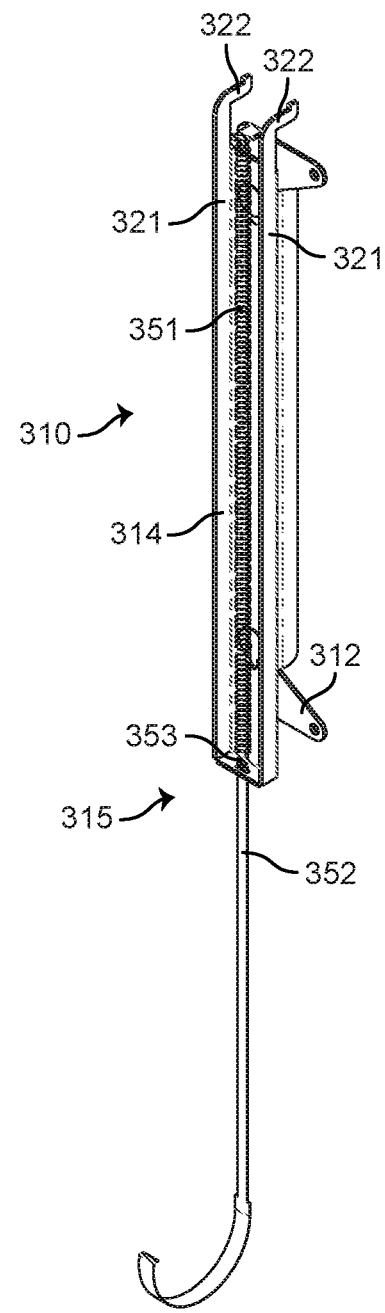
FIG. 27 is a perspective view of the release mechanism of FIG. 26, shown in a non-locking position.
Figure 28:
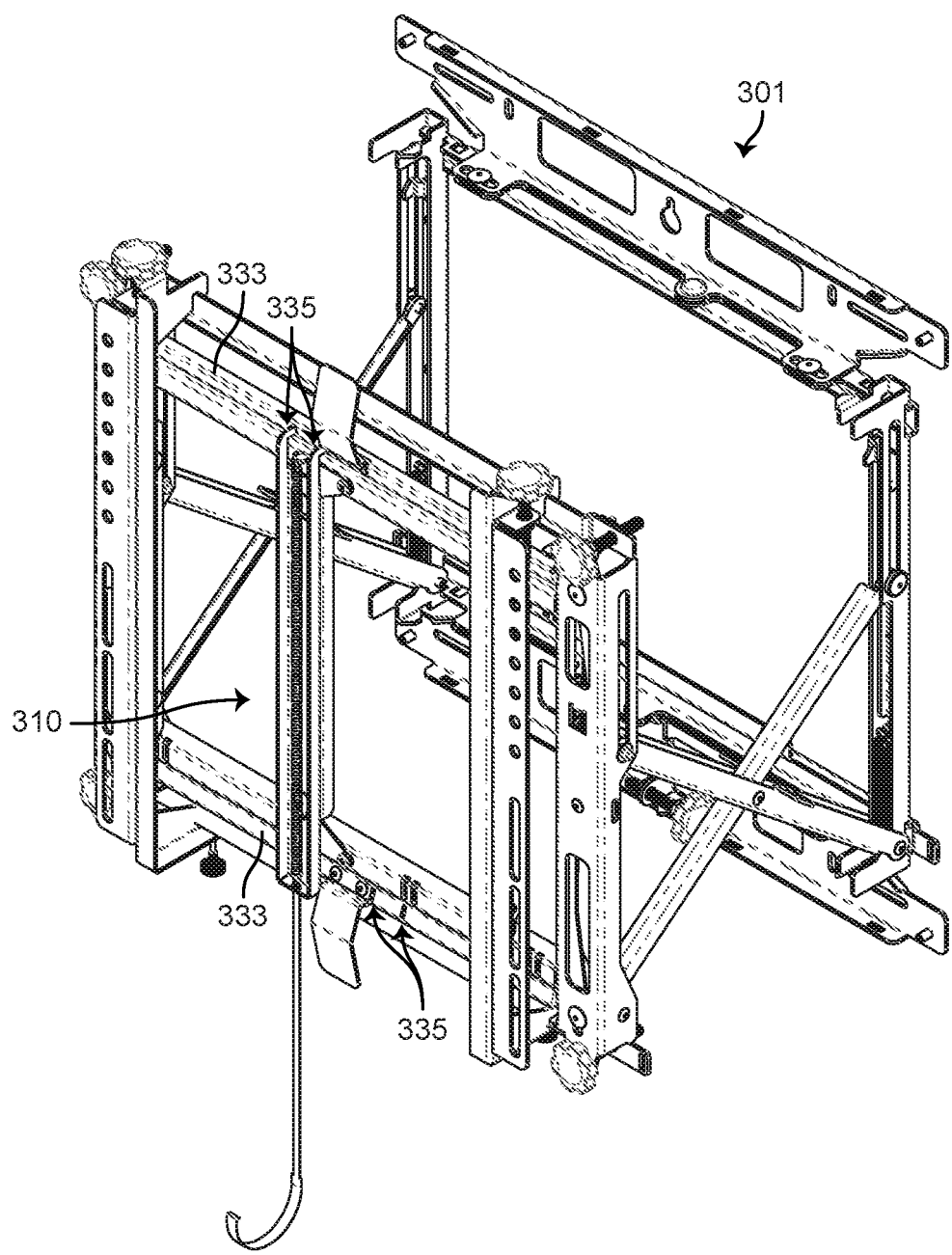
FIG. 28 is a perspective view of the mounting system of FIG. 25, shown in an extended position.
Figure 29:
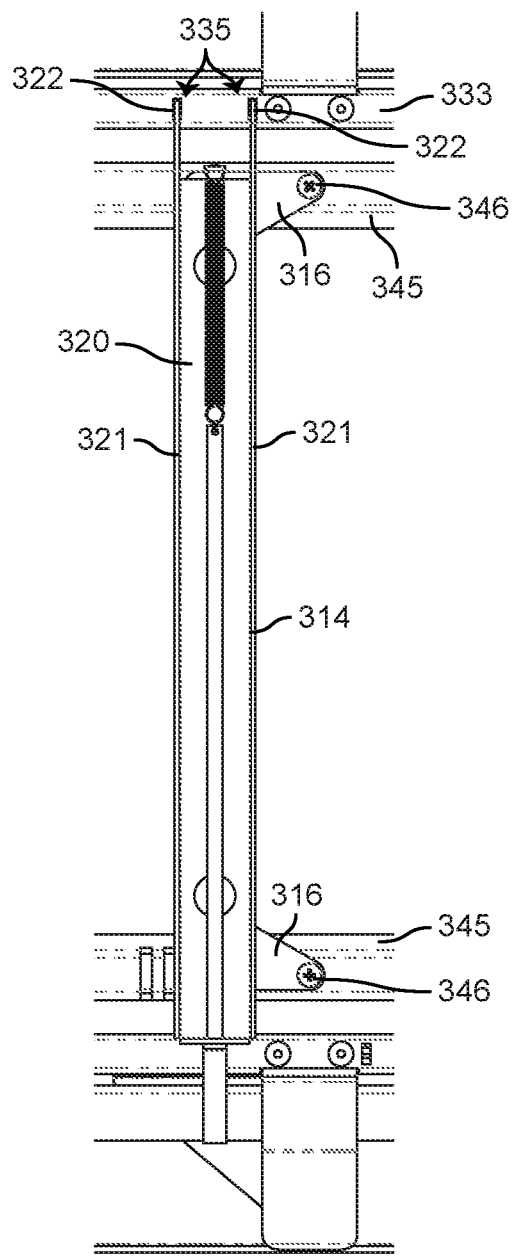
FIG. 29 is a front view of a portion of the mounting system of FIG. 25, with the release mechanism in the locking position.
Figure 41:
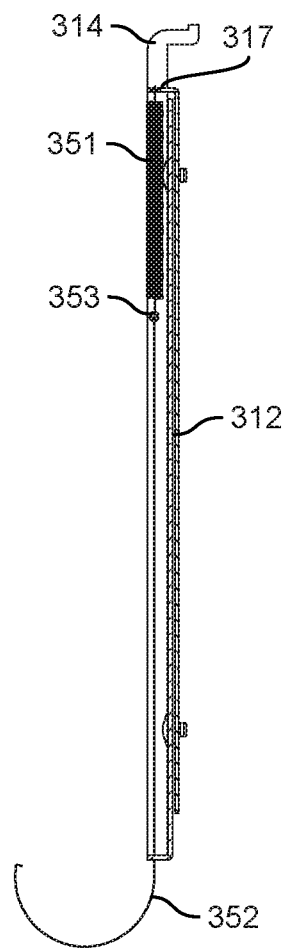
FIG. 41 is a cross-sectional view of the release mechanism of FIG. 30.

As shown in FIGS. 26 and 27, the release mechanism 310 of the mounting system 301 includes a first (e.g., stationary) bracket 312, a second (e.g., movable) bracket 314 that is movable relative to the first bracket 312, and an actuator 315 that is configured to move the second bracket 314 (e.g., relative to the first bracket 312). The first bracket 312 is coupled to the second frame assembly 342 and, thus, stationary relative to the second frame assembly. As shown in FIG. 29, the first bracket 312 includes a pair of spaced apart ears 316 that are configured to be coupled to spaced apart cross members 345 of the second frame assembly 342, respectively, through fasteners 346 (e.g., screws, bolts, rivets, etc.). As shown in FIGS. 26 and 41, the first bracket 312 includes a retaining feature 317 that is configured to retain a portion of the actuator (e.g., a portion of the spring), as described below in more detail. As shown, the retaining feature 317 is a tab that is formed over between the flanges 321. It is noted that the retaining feature 317 may be a flange, an opening, a combination thereof, or have any suitable arrangement for retaining another element.

Figure 32:
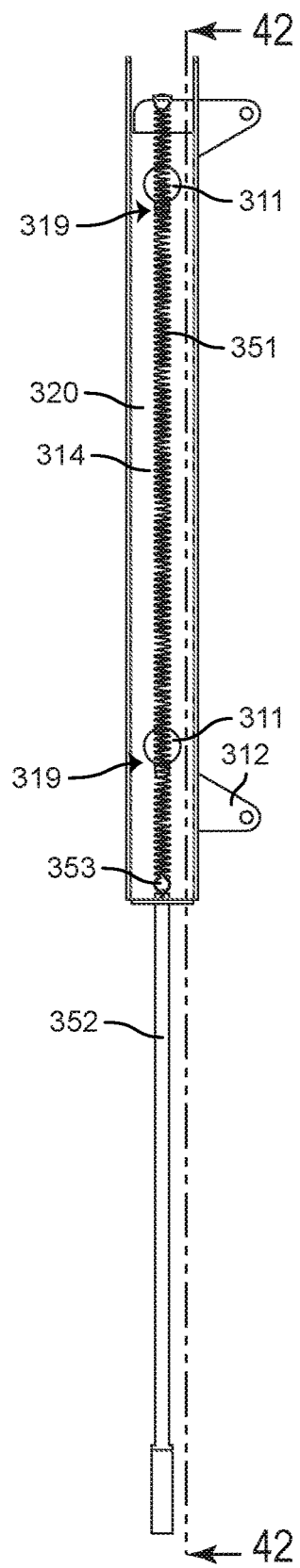
FIG. 32 is a front view of only the release mechanism of FIG. 31.
Figure 42:
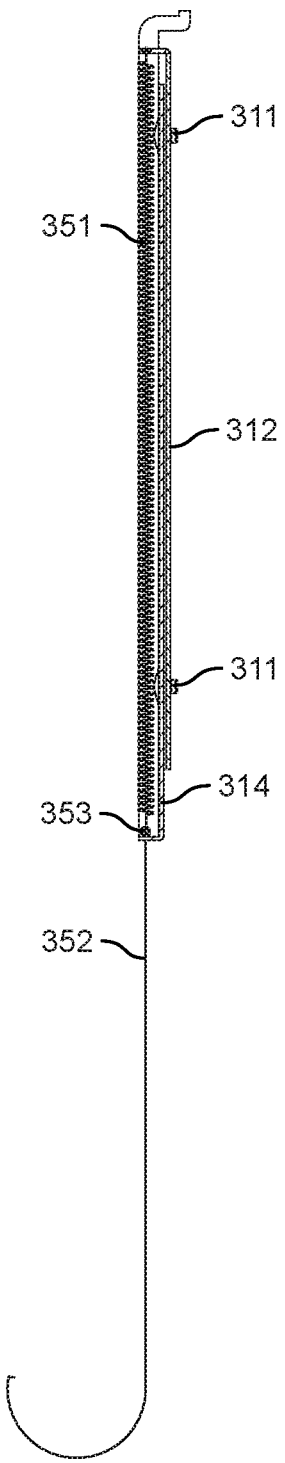
FIG. 42 is a cross-sectional view of the release mechanism of FIG. 32.

The second bracket 314 is configured to move relative to the first bracket 312 and is slidably coupled to the first bracket 312. As shown in FIGS. 32 and 42, a pair of spaced apart fasteners 311 slidably couples the first and second brackets 312, 314 together. Each fastener 311 is configured to be fixedly coupled to one of the brackets and the other bracket includes a clearance hole (e.g., a slot) that allows the fastener to slide in the hole. As shown, each fastener 311 is coupled to the first bracket 312 and the second bracket 314 includes a slotted hole 319 in a base 320 in which a stud of the fastener extends through. Each fastener 311 may include a head that slidably retains the second bracket 314 to the first bracket 312.

Figures 33, 34:
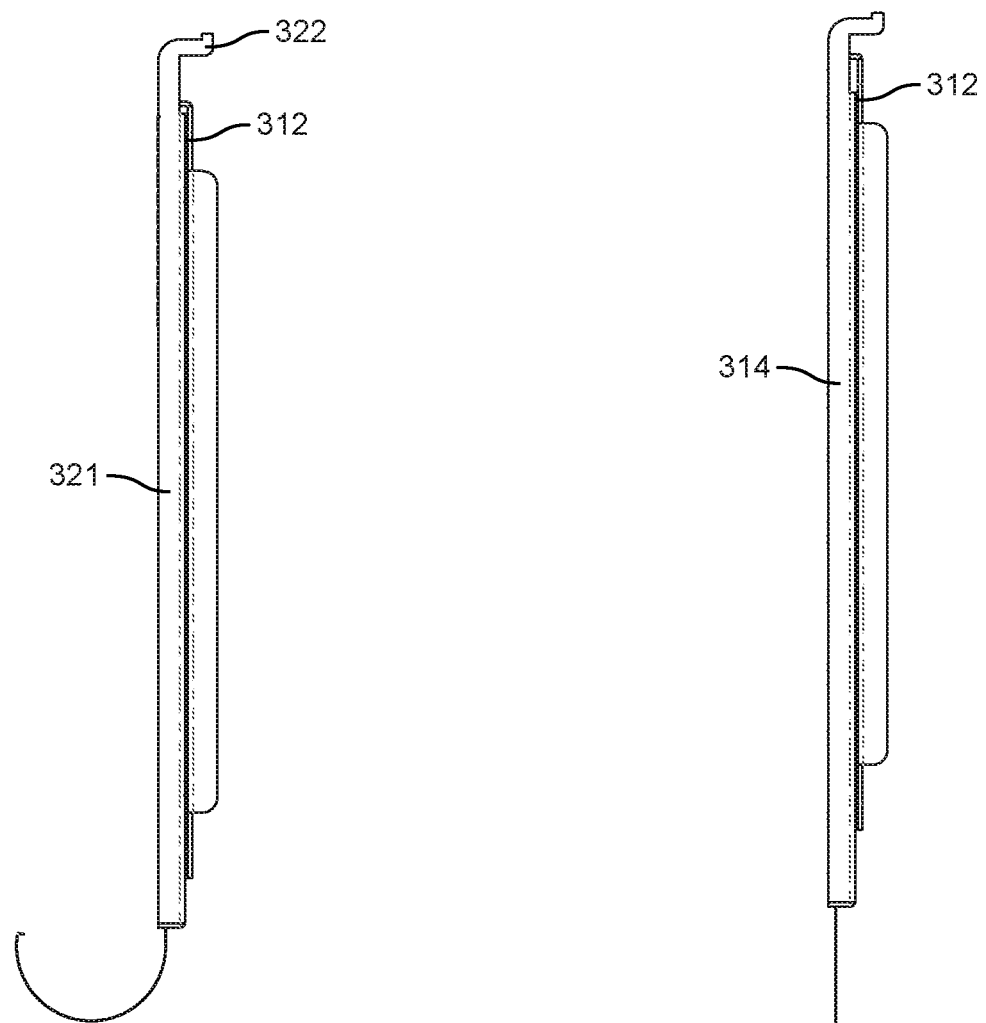
FIG. 33 is a side view of the release mechanism of FIG. 30.
FIG. 34 is a side view of the release mechanism of FIG. 32.
Figure 35:
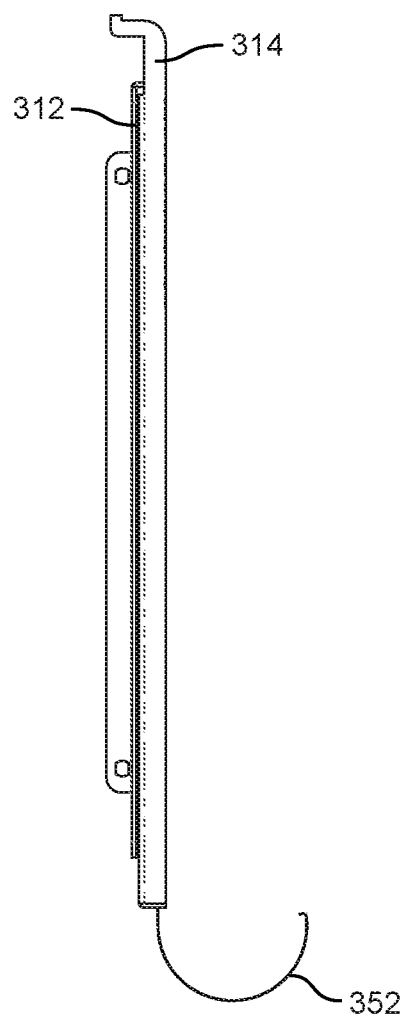
FIG. 35 is another side view of the release mechanism of FIG. 30.
Figure 36:
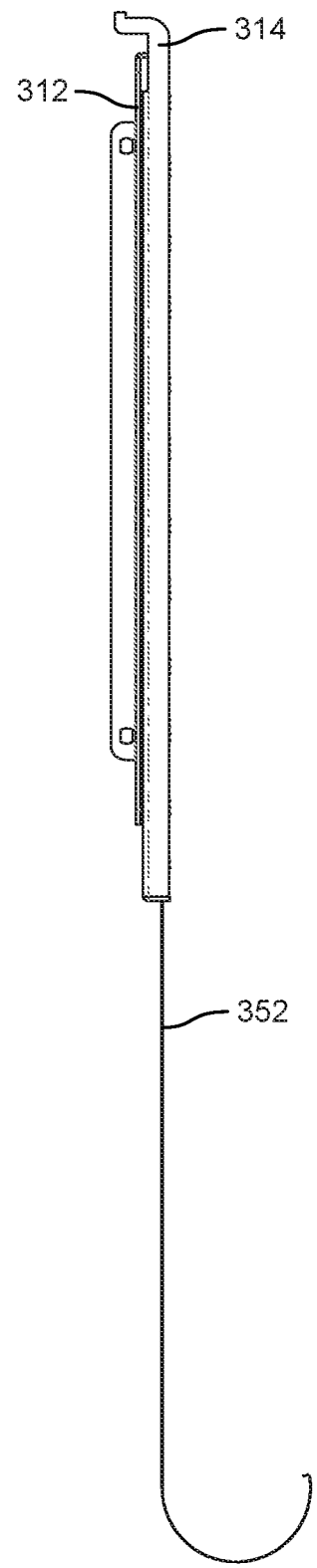
FIG. 36 is another side view of the release mechanism of FIG. 32.
Figure 37:
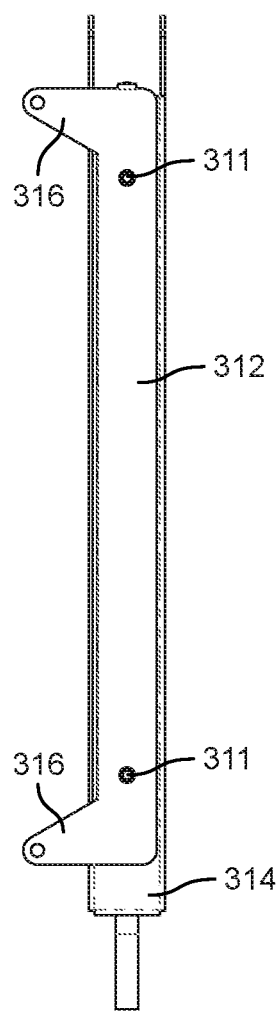
FIG. 37 is a rear view of the release mechanism of FIG. 30.
Figure 38:
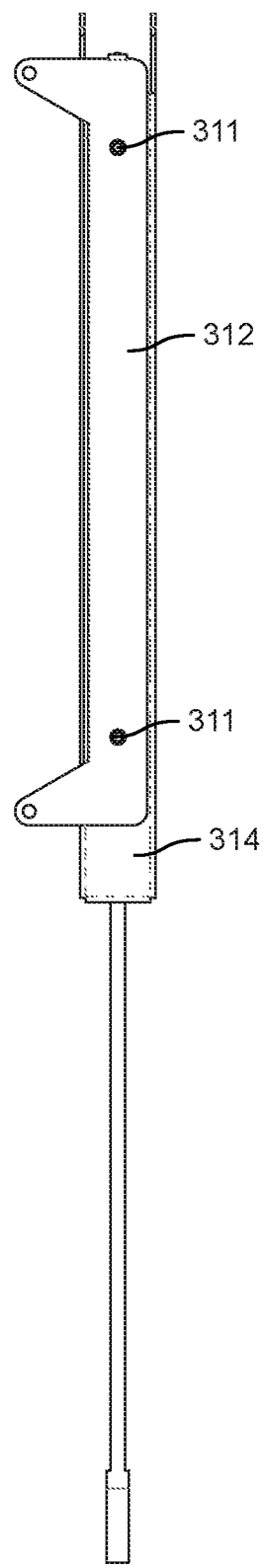
FIG. 38 is a rear view of the release mechanism of FIG. 32.
Figure 39:
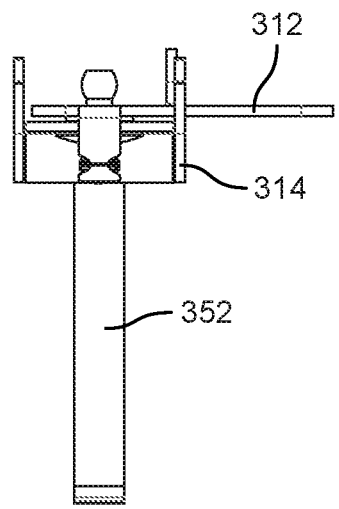
FIG. 39 is a top view of the release mechanism of FIG. 30.
Figure 40:
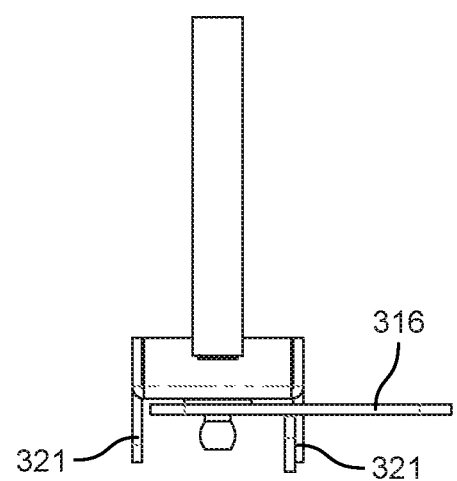
FIG. 40 is a bottom view of the release mechanism of v 30.

The second bracket 314 includes a pair of flanges 321 that extend from the base 320. As shown in FIGS. 27 and 29, the second bracket 314 includes a finger 322 that extends from each flange 321, such as, for example, an end of the flange. Each finger 322 of the second bracket 314 is configured to engage one of the openings 335 in the release member 333, such that movement (e.g., sliding) of the second bracket 314 in-turn moves (e.g., rotates) the release member 333 to disengage the latch mechanism(s). For example, a generally linear movement of the second bracket 314 relative to the first bracket 312 is configured to rotate the release member 333 in a releasing direction to thereby release each hook 130 from each eyelet 129. FIGS. 33-38 illustrate the linear movement of the second bracket 314 relative to the first bracket 312. FIGS. 33, 35, and 37 illustrate the second bracket 314 in a first position (e.g., corresponding to a locking position) with respect to the first bracket 312. FIGS. 34, 36, and 38 illustrate the second bracket 314 in a second position (e.g., corresponding to a non-locking position) with respect to the first bracket 312.

Figure 30:
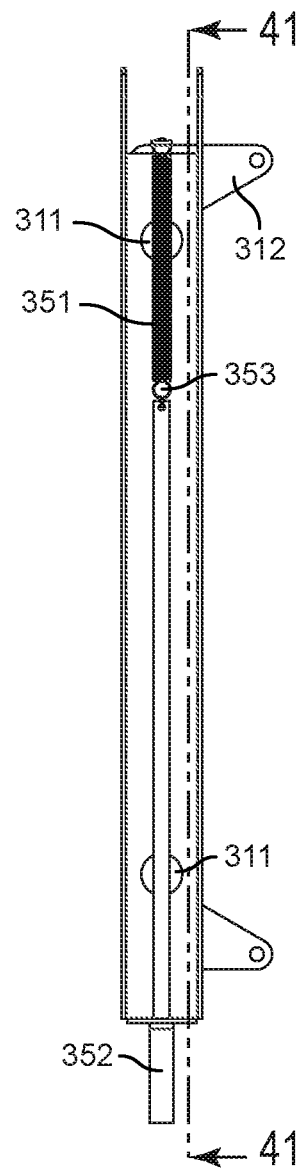
FIG. 30 is a front view of only the release mechanism of FIG. 29.
Figure 31:
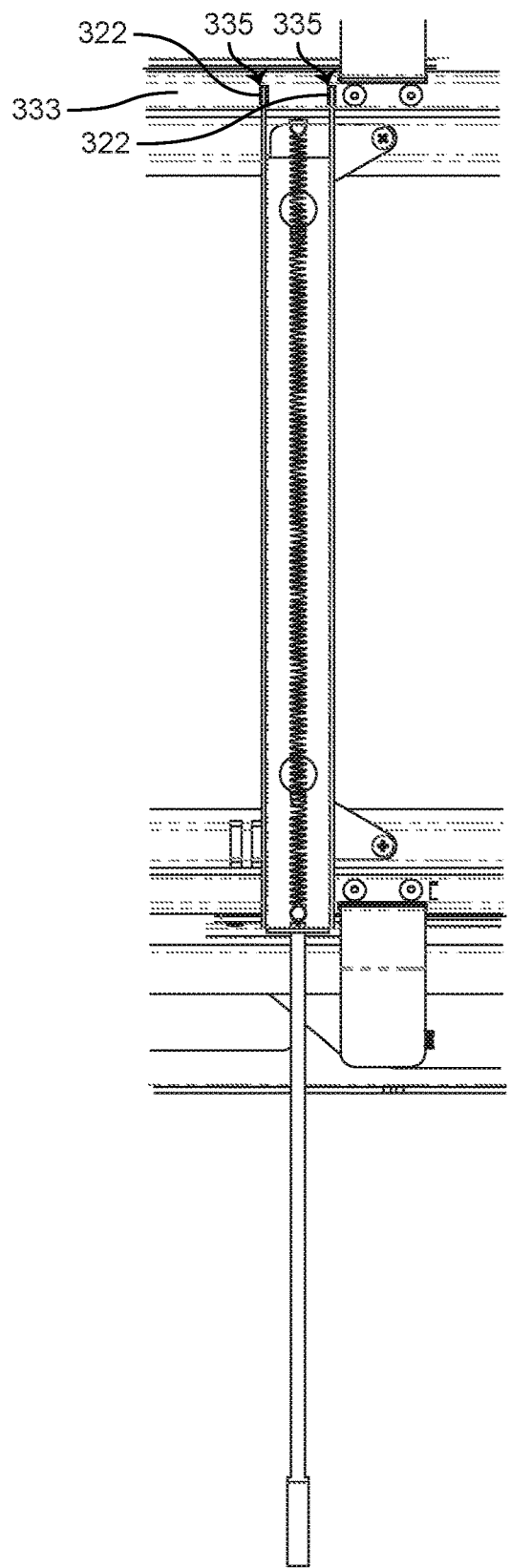
FIG. 31 is a front view of a portion of the mounting system of FIG. 25, with the release mechanism in the non-locking position.

The actuator 315 may include an actuating member that is configured to move the first bracket between positions and a biasing member that is configured to bias the actuating member. As shown in FIGS. 27, 30, and 32, the actuator 315 includes a biasing member in the form of a spring 351 and an actuating member in the form of a strap 352.

The spring 351, as shown, is an extension spring (e.g., a coil spring) that has a first end (e.g., tang) coupled to the retaining feature 317 of the first bracket 312 and a second end (e.g., tang) coupled to the strap 352. Thus, when the strap 352 is moved (e.g., pulled by a user), the second end of the spring 351 moves with the strap 352. It is noted that other types of springs or biasing members may be employed with the actuator. As shown, the spring 351 is configured to be disposed between the flanges 321 of the second bracket 314.

The strap 352 includes a first end that is configured to be actuated (e.g., pulled) by a user and a second end that is coupled to the spring 351. According to one example, the strap 352 is made of spring steel, which may advantageously retain a desired shape (e.g., a J-shape), while holding on an edge of different sized display devices that can be mounted to the system. By being spring steel, the strap can form to different shapes and sizes of various display devices. As shown in FIGS. 26 and 27, the strap 352 is configured to extend through a window in a bottom flange of the second bracket 314.

The actuator 315 may also include a contact member that is configured to contact and move the second bracket 314. As shown in FIGS. 27, 30, and 32, the actuator 315 includes a contact member in the form of a split ring 353 that is coupled to the second end of the spring 351 and the second end of the strap 352. The split ring 353 has a size (e.g., width, diameter, etc.) that is larger than a corresponding size of the window in the bottom flange of the second bracket 314, such that the split ring 353 is brought into contact with the bottom flange, as shown in FIGS. 27 and 32. Once in contact with the bottom flange, further movement of the strap 352 (and the split ring 353) moves the second bracket 314 a corresponding distance. The movement of the strap 352 may result in a movement of the second bracket 314 through the contact between the contact member (e.g., the split ring 353) and the second bracket 314.

According to another example, a portion of the spring 351 (e.g., the second end of the spring 351) may contact the second bracket 314 directly to move the second bracket 314. For example, the tang, a coil (e.g., the first coil), or any other feature of the spring may contact the second bracket 314 to move it with further movement of the strap and spring.

Figure 43:
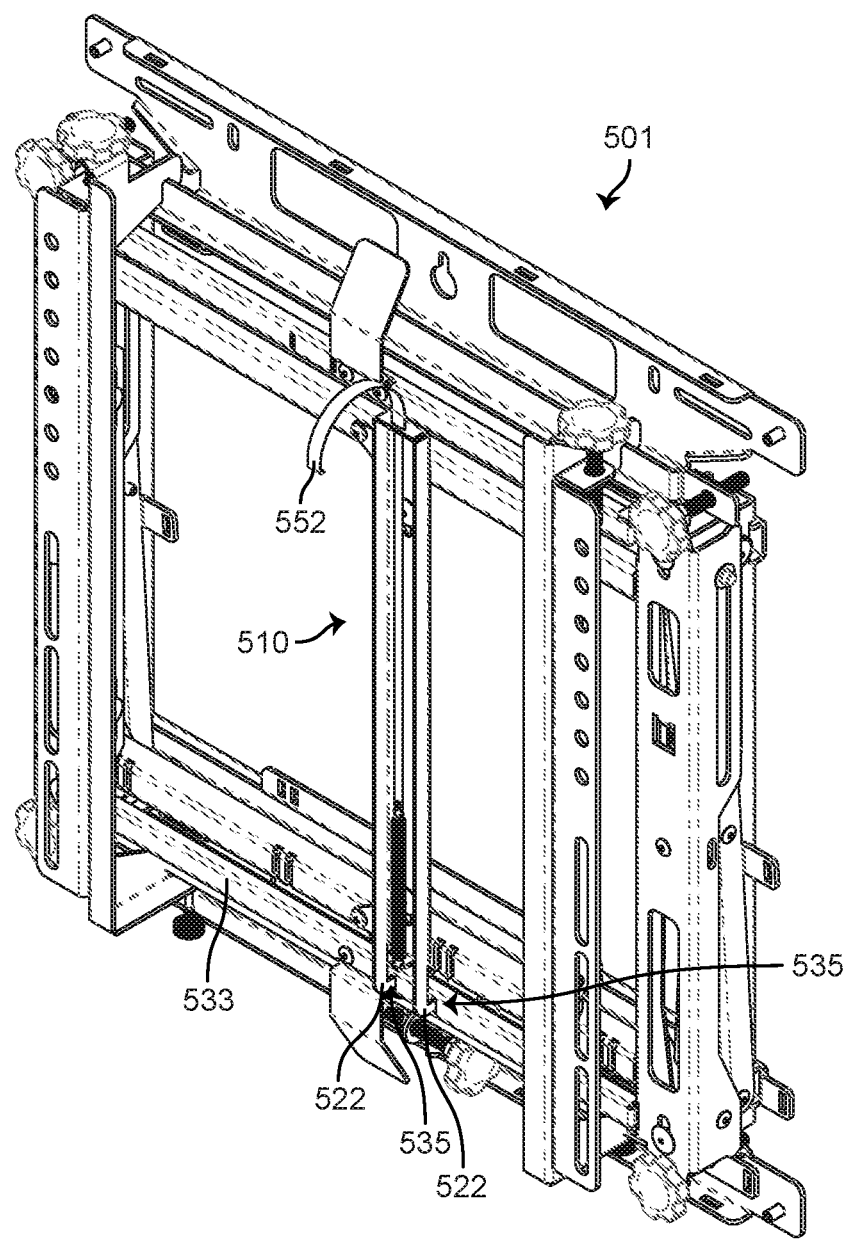
FIG. 43 is a perspective view of a mounting system shown in a collapsed position and having a release mechanism, according to another exemplary embodiment.

FIG. 43 illustrates another exemplary embodiment of a mounting system 501 that is configured basically the same as the mounting system 301, except the (quick) release mechanism 510 has been rotated 180° (one-hundred and eighty degrees) relative to the remaining system. As shown, the release mechanism 510 includes a first bracket coupled to upper and lower members (similar to the release mechanism 310). The release mechanism 510 further includes a second bracket that is movable relative to the first bracket. The second bracket of the release mechanism 510 includes two fingers 522 that engage mating openings 535 in the lower release member 533, such that movement of the second bracket in a releasing direction is configured to rotate the release member 533 to disengage the hooks of the system from the eyelets of the system. For this arrangement, the strap 552 that is configured to move the second bracket and release the hooks is located at the top of the mounting system 501 (as opposed to the bottom, such as for the mounting system 301).

It is noted that each of the mounting systems 101, 301, 501 can be configured to have a release mechanism 310, 510 coupled thereto in either the arrangement shown in FIGS. 25-42 or the arrangement shown in FIG. 43. In other words, the features to facilitate using such a release mechanism may be included in any system disclosed in this application.

Figure 44:
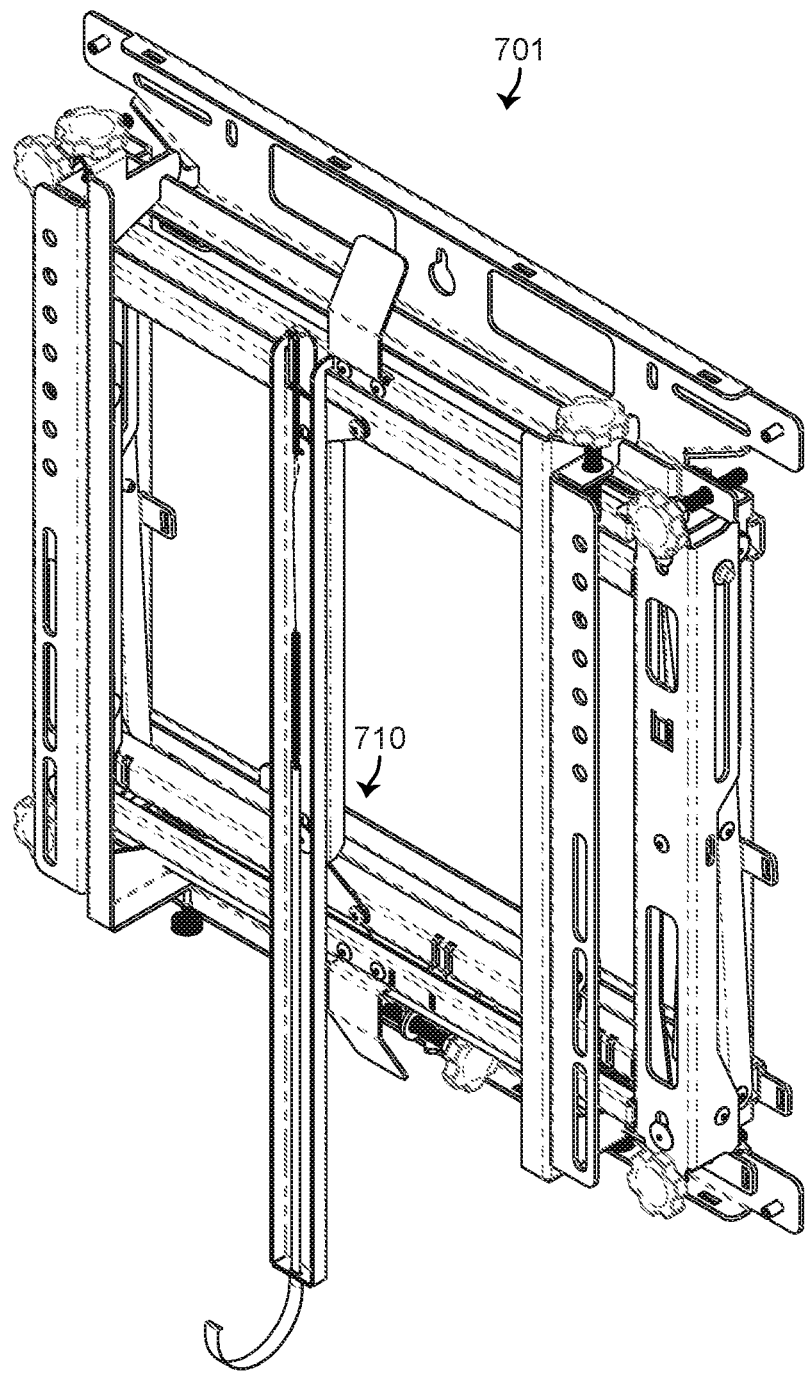
FIG. 44 is a perspective view of a mounting system shown in a collapsed position and having a release mechanism, according to yet another exemplary embodiment.
Figure 45:
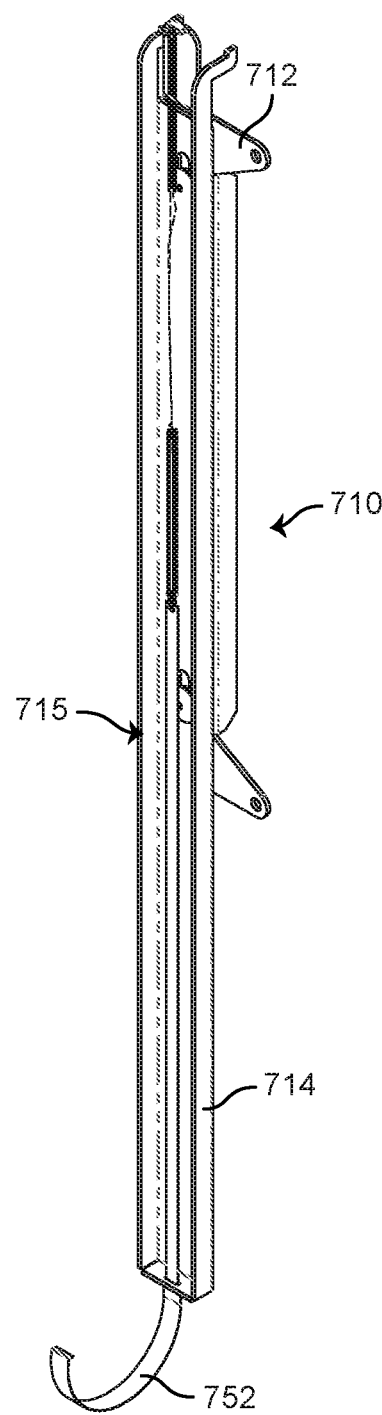
FIG. 45 is a perspective view of the release mechanism of FIG. 44.

FIGS. 44 and 45 illustrate another exemplary embodiment of a mounting system 701 that includes a release mechanism 710. As shown, the mounting system 701 is configured basically the same as the mounting system 301, except the release mechanism 710 includes a longer bracket (e.g., the second bracket) to accommodate larger display devices and/or rotating a mounted display device into a "portrait" mounting arrangement (as opposed to a "landscape" mounting arrangement). The release mechanism 710 includes a first bracket 712 that, according to one example, is configured basically the same as the first bracket 312. The release mechanism 710 also includes a second bracket 714 that, according to one example, is configured similar to the second bracket 314, except that it is longer and extends downwardly a farther distance. The release mechanism 710 includes an actuator 715 having a strap 752 that is configured to be actuated (e.g., pulled) by the user.

Figure 64:
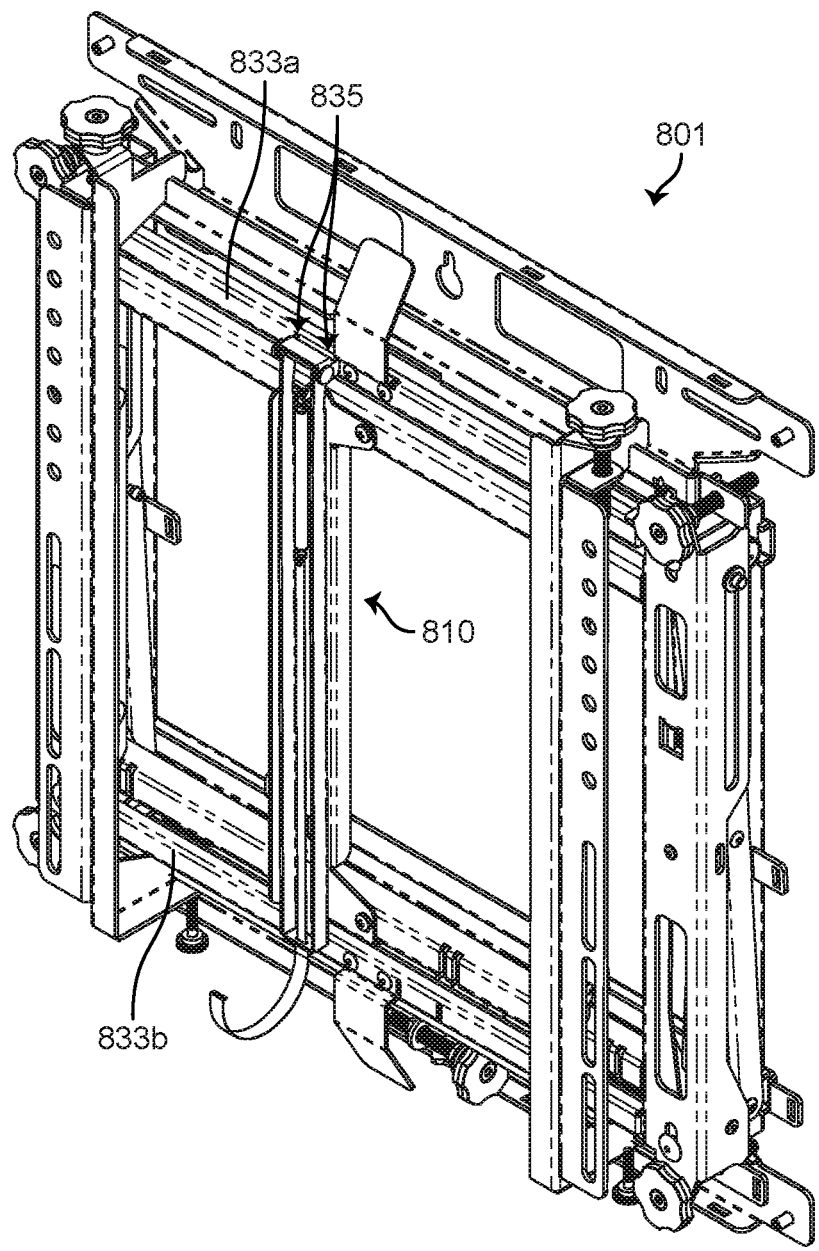
FIG. 64 is a perspective view of a mounting system, shown in a collapsed position and including a release mechanism, according to another exemplary embodiment.

FIGS. 64-68 illustrate another exemplary embodiment of a release mechanism 810 (e.g., quick release mechanism) for use with the mounting system 801. The mounting system 801 may be configured the same as, similar to, or different than the mounting system 101. By way of example, the mounting system 801 may be substantially similar to the mounting system 101, except it further includes the release mechanism 810, which is configured to allow for movement of the mounting system 801, such as between a collapsed position and an extended position by moving a release member. As shown in FIG. 64, the mounting system 801 includes an upper release member 833a and a lower release member 833b, and the release mechanism 810 is configured to rotate the upper release member 833a from a locking position to a non-locking position upon actuation of the release mechanism 810 (discussed in more detail below). It is noted that the lower release member 833b in this embodiment is configured to be rotated from the locking position to the non-locking position by rotation of the upper release member 833a through a linkage assembly (e.g., the linkage assembly 135).

As shown in FIGS. 65-68, the release mechanism 810 includes a first bracket 812 that is coupled to the frame assembly (e.g., the second frame assembly) to remain stationary relative to the frame assembly, a second bracket 813 that is movable relative to the first bracket 812, an actuator 814 that is configured to move the second bracket 813 relative to the first bracket 812, and a pivot assembly 815 that is configured to rotate upon relative movement between the first and second brackets, such as to drive rotation of a release member. Each of the first bracket 812, the second bracket 813 and actuator 814 can be configured in a substantially similar manner as the counterpart first bracket 312, second bracket 314 and actuator 315 discussed above, except where noted otherwise.

The second bracket 813 does not include fingers as noted above with respect to the second bracket 314. Instead, the pivot assembly 815 is rotatably coupled to one or more than one flange 821 of the second bracket 813 to allow rotation of at least a portion of the pivot assembly 815 relative to the second bracket 813. As shown in FIGS. 65 and 66, the pivot assembly is rotatably coupled to an end of each of two spaced apart flanges 821 of the second bracket 813 through a pivot member 816. As shown, the pivot member 816 includes a body that extends through openings in the ends of the flanges 821 and a head located on each side of the body adjacent to an outside of the respective flange. Each head of the pivot member 816 is larger in size, such as in diameter than the body to retain the pivot member 816 in place relative to the second bracket 813. Also shown, the pivot assembly 815 includes a pivot bracket 817 rotatably coupled to or rotatable relative to the pivot member 816. As shown, the pivot bracket 817 includes a base and two spaced apart fingers 818 extending away from the base. Each finger 818 is configured to engage an opening 835 in the release member (e.g., the upper release member 833*a* shown in FIG. 64). Thus, the pivot assembly 815 may be configured similar to a yoke or a clevis.

To release the mounting system 801, the actuator 814 is moved to a release position (e.g., non-locking position) to move the second bracket 813 relative to the stationary first bracket 812. As shown, a strap 823 of the actuator 814 can be pulled from a locking (e.g., engaged) position, as shown in FIGS. 65 and 67, to the release position, as shown in FIGS. 66 and 68, to move the second bracket 813 relative to the stationary first bracket 812. Moving the actuator 814 to the release position is configured to rotate the release member that the fingers 818 engage through the pivot assembly 815, such as the upper release member 833*a*. The movement of the second bracket 813 induces forces between the fingers 818 and the associated release member (e.g., the upper release member 833*a* shown in FIG. 64), which creates a torque about the pivot axis of the pivot member 816. This torque rotates the release member to the release position upon a preset movement (e.g., a predetermined length of movement) of the actuator 814.

Figure 69:
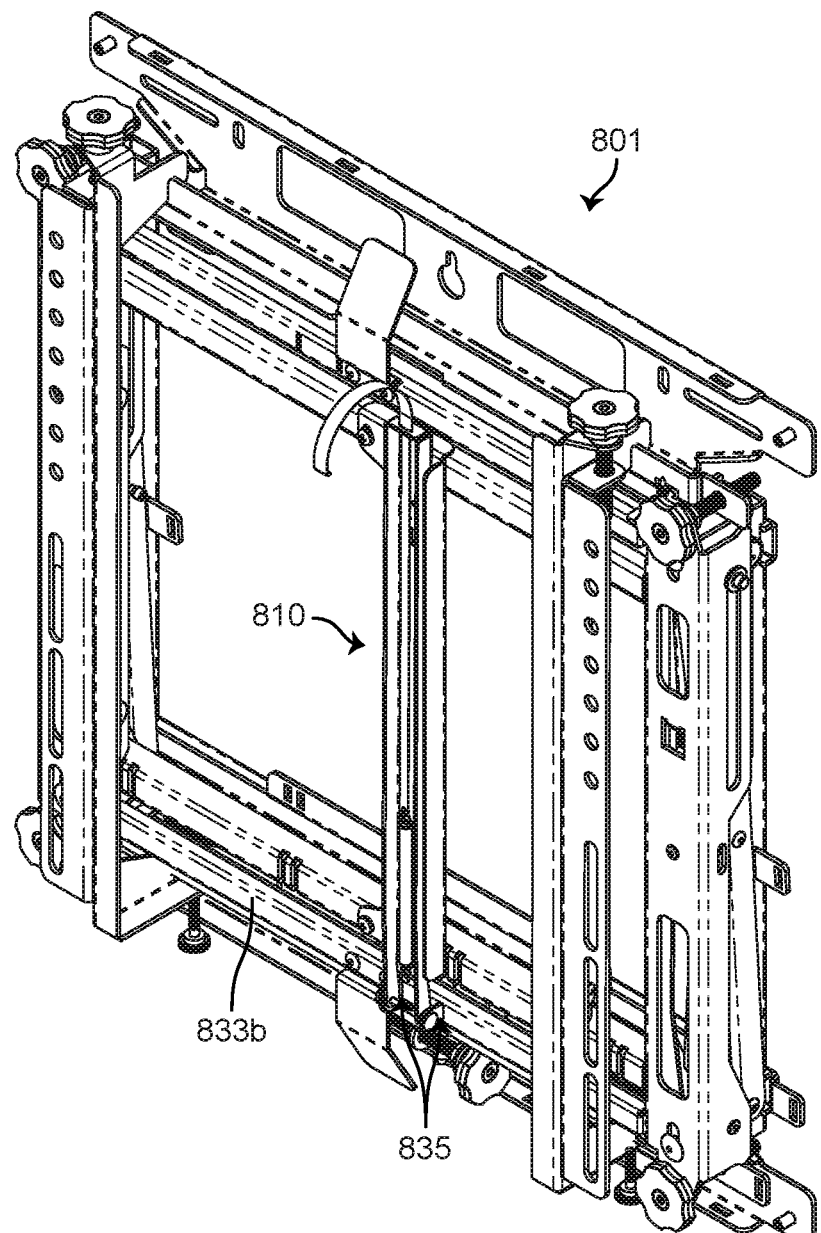
FIG. 69 is a perspective view of a mounting system, shown in a collapsed position and including the release mechanism shown in FIG. 65 but in an inverted position.

FIG. 69 illustrates the release mechanism 810 arranged in an inverted configuration to allow release of the mounting system 801. The release mechanism 810 is configured the same as that described above, except that the release mechanism 810 is mounted to the mounting system 801 in an inverted configuration (e.g., manner, arrangement, etc.), rather than an upright configuration as shown in FIGS. 64-68. The upright configuration allows for a user to actuate the system (e.g., move the release members) from below the system, since the strap 823 is configured to hang below the system. Conversely, the inverted configuration allows for a user to actuate the system from above the system, since the strap 823 is configured to be disposed above the system. For the inverted configuration shown in FIG. 69, the fingers 818 are configured to engage openings 835 in the lower release member 833*b*, rather than the openings in the upper release member 833*a*.

Figure 70:
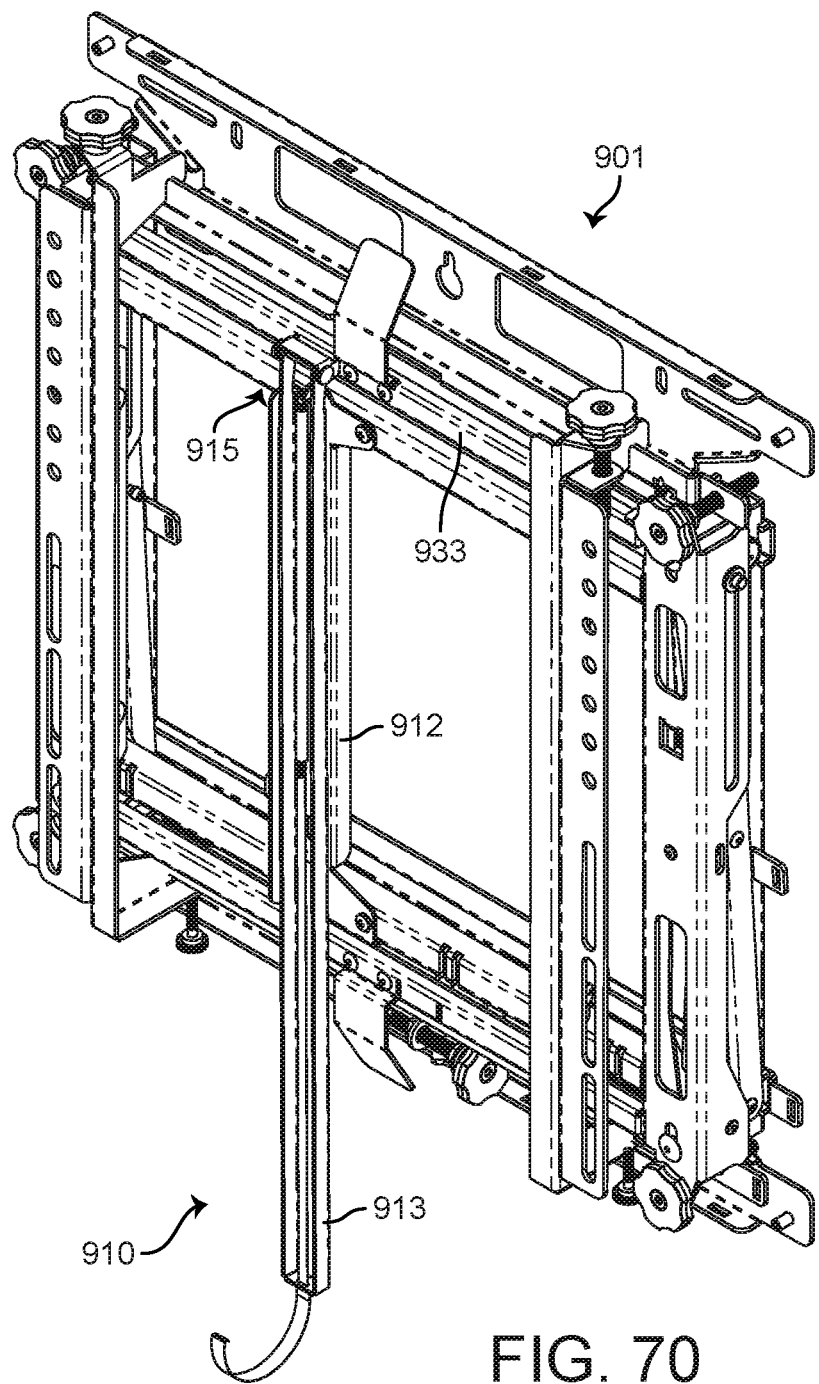
FIG. 70 is a perspective view of a mounting system, shown in a collapsed position and including a release mechanism, according to yet another exemplary embodiment.
Figure 71:
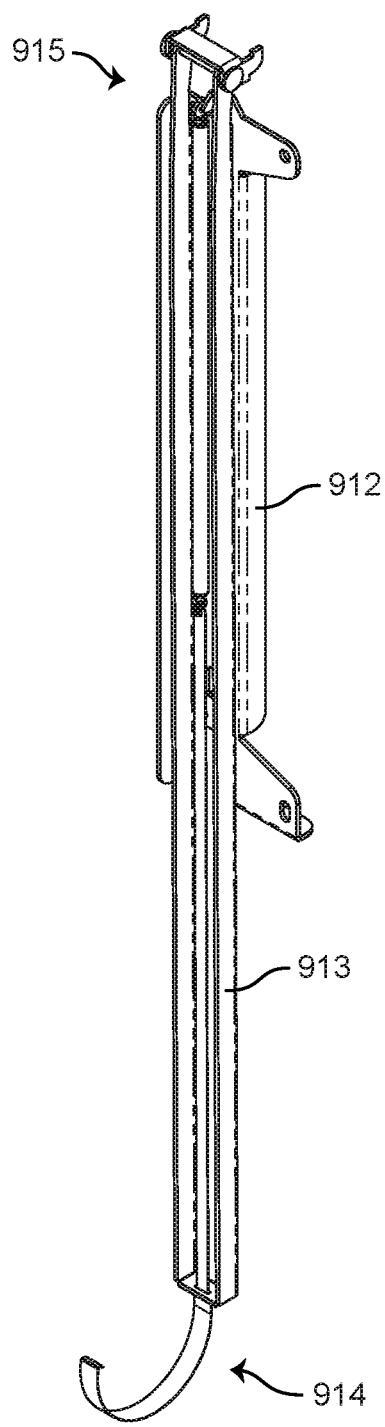
FIG. 71 is a perspective view of the release mechanism shown in FIG. 70 in a locking position.

FIGS. 70 and 71 illustrate yet another exemplary embodiment of a release mechanism 910 for use with a mounting system 901. The mounting system 901 is configured in a substantially similar manner to the mounting system 801, except the mounting system 901 includes the release mechanism 910 in place of the release mechanism 810. The release mechanism 910 is configured to allow for movement of the mounting system 901 between a collapsed position and an extended position by moving a release member 933. The mounting system 901 may include more than one release member, and the release mechanism 910 may be configured to directly rotate one release member and indirectly rotate the other release member(s) through a linkage assembly (e.g., the linkage assembly 135).

The release mechanism 910 is configured in a similar manner as the release mechanism 810, including a first bracket 912, a second bracket 913, an actuator 914 and a pivot assembly 915, except the release mechanism 910 includes a longer bracket and/or a longer actuator 914. For example, the second bracket 913 of the release mechanism 910 is longer than the second bracket 813 of the release mechanism 810 to accommodate larger display devices and/or rotating a mounted display device into a "portrait" mounting arrangement (as opposed to a "landscape" mounting arrangement). The actuator 914 or portion thereof (e.g., a strap) may be longer compared to the actuator 913 to accommodate the increased length of the second bracket 913. The first bracket 912, a second bracket 913, an actuator 914 and a pivot assembly 915 may otherwise be configured in a manner substantially similar to the corresponding element/component of the release mechanism 810. The release mechanism 910 may be coupled to the mounting system 901 in an upright configuration, as shown in FIG. 70, or in an inverted configuration, similar to that shown in FIG. 69.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

The construction and arrangement of the elements of the mounting systems as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., surface mount, extension assembly, device mount, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A mounting system configured to support a display device and configurable in a first position and a second position that is different than the first position, the mounting system comprising:
   a first frame assembly configured to mount to a mounting surface;
   a second frame assembly movable relative to the first frame assembly, the second frame assembly configured to support the display device and including a first hook that is configured to engage a first opening of the first frame assembly and a second hook that is configured to engage a second opening of the first frame assembly to secure the mounting system in the first position;
   a first release member configured to move the first hook to engage and disengage the first opening upon movement of the first release member;
   a second release member configured to move the second hook to engage and disengage the second opening upon movement of the second release member; and
   a linkage assembly configured to communicate movement of one of the first and second release members to move the other of the first and second release members, wherein the linkage assembly includes a first link member operatively coupled to the first release member, a second link member operatively coupled to the second release member, and a third link member coupled to the first and second link members, such that movement of one of the first and second link members moves the other of the first and second link members through the third link member.

2. The mounting system of claim 1, wherein the third link member is pivotally coupled to the first link member and the second link member, such that movement of one of the first and second link members moves the other of the first and second link members via a rotation of the third link member.

3. The mounting system of claim 2, wherein each of the first and second link members move in a generally linear direction upon movement by an associated one of the first and second release members.

4. The mounting system of claim 3, wherein each release member is configured to be rotated to move the associated hook to engage and disengage an associated one of the first and second openings.

5. The mounting system of claim 1, further comprising a release mechanism including:
   a first bracket coupled to the second frame assembly;
   a second bracket movably coupled to the first bracket and including a finger that engages one of the first and second release members to move the release member when moved relative to the first bracket; and
   an actuator configured to move the second bracket relative to the first bracket.

6. The mounting system of claim 5, wherein the actuator comprises:
   a biasing member having a first end coupled to the first bracket; and
   a strap having a first end that is configured to be actuated by a user and a second end that is coupled to a second end of the biasing member,
   wherein movement of the strap results in a movement of the second bracket via the biasing member.

7. The mounting system of claim 5, wherein the actuator further comprises a contact member that is coupled to the second end of the biasing member and the second end of the strap, and wherein movement of the strap results in a movement of the second bracket via the contact between the contact member and the second bracket.

8. The mounting system of claim 1, wherein the linkage assembly is a first linkage assembly, and further comprising a second linkage assembly that comprises:
   a first link member operatively coupled to the first release member;
   a second link member operatively coupled to the second release member; and
   a third link member coupled to the first and second link members of the second linkage assembly, such that movement of one of the first and second link members of the second linkage assembly moves the other of the first and second link members of the second linkage assembly through the third link member of the second linkage assembly.

9. The mounting system of claim 8, wherein the second frame assembly comprises a first side member and a second side member spaced apart from the first side member, wherein the first linkage assembly is nested within the first side member, and wherein the second linkage assembly is nested within the second side member.

10. The mounting system of claim 9, wherein each side member of the second frame assembly includes a base and the associated third link member is pivotally coupled to the base.

11. The mounting system of claim 10, wherein each side member of the second frame assembly includes a flange extending from each side of the base, and each flange includes a first opening and a second opening, wherein a first pivot member is rotatably coupled to the flange through the first opening, wherein a second pivot member is rotatably coupled to the flange through the second opening, and wherein the first pivot member is rotatably coupled to the second pivot member to move the second frame assembly relative to the first frame assembly.

12. The mounting system of claim 10, wherein each side member of the second frame assembly includes a flange extending from a side of the base, wherein the flange includes a first slot and a second slot, wherein a first end of the associated first link member extends through the first slot to couple to an end of the first release member, and wherein a first end of the associated second link member extends through the second slot to couple to an end of the second release member.

13. The mounting system of claim 12, wherein each first link member includes a second end that is coupled to the associated third link member, and wherein each second link member includes a second end that is coupled to the associated third link member.

14. The mounting system of claim 13, further comprising a spring coupled to the second frame assembly and at least one of the first link member or the second link member to store and release energy upon relative movement between the second frame assembly and the first and second link members.

15. The mounting system of claim 9, wherein the second frame assembly comprises a first cross member and a second cross member spaced apart from the first cross member, and further comprising a release mechanism that comprises:
- a first bracket coupled to at least one of the first cross member or the second cross member of the second frame assembly;
- a second bracket movably coupled to the first bracket and including a finger that engages one of the first and second release members to move the engaged release member when the second bracket is moved relative to the first bracket; and
- an actuator configured to move the second bracket relative to the first bracket.

16. A mounting system configured to support a display device and configurable in more than one position to adjust a position of the display device, the mounting system comprising:
- a first frame assembly configured to mount to a mounting surface;
- a second frame assembly movable relative to the first frame assembly through an adjustment assembly, the second frame assembly including a first side member and a second side member that is spaced apart from the first side member;
- a latch mechanism for securing the second frame assembly relative to the first frame assembly in at least one position;
- a first release member configured to move the latch mechanism into a non-locking position allowing movement of the second frame assembly relative to the first frame assembly;
- a second release member spaced apart from the first release member and configured to move the latch mechanism into the non-locking position;
- a first linkage assembly configured to communicate movement of one of the first and second release members to move the other of the first and second release members, wherein the first linkage assembly is associated with the first side member; and
- a second linkage assembly configured to communicate movement of one of the first and second release members to move the other of the first and second release members, wherein the second linkage assembly is associated with the second side member.

17. The mounting system of claim 16, wherein each linkage assembly of the first and second linkage assemblies comprises:
- a first link member operatively coupled to the first release member;
- a second link member operatively coupled to the second release member; and
- a third link member operatively coupled to the first and second link members, such that movement of one of the first and second link members moves the other of the first and second link members through the third link member.

18. The mounting system of claim 17, wherein a portion of each first link member is directly coupled to the first release member, and wherein a portion of each second link member is directly coupled to the second release member.

19. A mounting system configured to support a display device and configurable in more than one position to adjust a position of the display device, the mounting system comprising:
- a first frame assembly configured to mount to a mounting surface;
- a second frame assembly movable relative to the first frame assembly between an extended position and a retracted position, the second frame assembly including a first side member and a second side member that is spaced apart from the first side member;
- a latch mechanism configured to secure the second frame assembly to the first frame assembly in the retracted position;
- a first release member configured to release the latch mechanism allowing movement of the second frame assembly relative to the first frame assembly;
- a second release member spaced apart from the first release member and configured to release the latch mechanism; and
- a first linkage assembly configured to communicate movement of one of the first and second release members to move the other of the first and second release members, wherein the first linkage assembly is associated with one of the first and second side members.

20. The mounting system of claim 19, further comprising a second linkage assembly configured to communicate movement of one of the first and second release members to move the other of the first and second release members, wherein the second linkage assembly is associated with the other of the first and second side members, wherein each linkage assembly comprises:
- a first link member operatively coupled to the first release member;
- a second link member operatively coupled to the second release member; and
- a third link member operatively coupled to the first and second link members, such that movement of one of the first and second link members moves the other of the first and second link members through the third link member.

21. The mounting system of claim 20, wherein a general sliding motion of at least one of the first link member or the second link member rotates the associated third link member, which in-turn generally slides the other of the first link member or the second link member.

22. The mounting system of claim 19, further comprising:
- a first adjustment member adjustably coupling a first support bracket and a first attachment bracket; and
- a second adjustment adjustably coupling a second support bracket and a second attachment bracket;
- wherein each support bracket is configured to support the display device; and
- wherein each attachment bracket is coupled to the second frame assembly, such that movement of both of the first and second adjustment members in the same direction by the same amount translates the display device in a vertical direction, and movement of one of the of the first and second adjustment members or movement of both the first and second adjustment members in different directions tilts the display device about a roll axis.

23. The mounting system of claim 22, further comprising a third adjustment member adjustably coupling the second frame assembly and the first frame assembly, wherein adjustment of the third adjustment member in a first direction translates the display device and the second frame assembly relative to the first frame assembly in a first lateral direction, and wherein adjustment of the third adjustment member in a second direction translates the display device and the second frame assembly relative to the first frame assembly in a second lateral direction that is opposite to the first lateral direction.

24. The mounting system of claim 23, further comprising a fourth adjustment member, a fifth adjustment member, a sixth adjustment member, and a seventh adjustment member, wherein adjustment of all of the fourth, fifth, sixth and seventh adjustment members in the same direction by the same amount translates the display device relative to the first frame assembly in a fore and aft direction, wherein adjustment of the fourth and fifth adjustment members or the sixth and seventh adjustment members in the same direction by the same amount tilts the display device relative to the first frame assembly about a pitch axis, and wherein adjustment of the fourth and sixth adjustment members or the fifth and seventh adjustment members in the same direction by the same amount tilts the display device relative to the first frame assembly about a yaw axis.

\* \* \* \* \*